(12) United States Patent
Lee

(10) Patent No.: US 11,069,355 B2
(45) Date of Patent: Jul. 20, 2021

(54) HOME APPLIANCE AND SPEECH RECOGNITION SERVER SYSTEM USING ARTIFICIAL INTELLIGENCE AND METHOD FOR CONTROLLING THEREOF

(71) Applicant: LG Electronics Inc., Seoul (KR)

(72) Inventor: Heungkyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 16/523,548

(22) Filed: Jul. 26, 2019

(65) Prior Publication Data

US 2020/0035235 A1 Jan. 30, 2020

(30) Foreign Application Priority Data

Jul. 27, 2018 (KR) .................. 10-2018-0087782

(51) Int. Cl.
*G10L 15/22* (2006.01)
*G10L 15/18* (2013.01)
(Continued)

(52) U.S. Cl.
CPC .............. *G10L 15/22* (2013.01); *G10L 13/00* (2013.01); *G10L 15/1815* (2013.01);
(Continued)

(58) Field of Classification Search
None
See application file for complete search history.

(56) References Cited

U.S. PATENT DOCUMENTS

| | | | |
|---|---|---|---|
| 6,640,145 B2 * | 10/2003 | Hoffberg ............ | G05B 19/0426 700/17 |
| 7,006,881 B1 * | 2/2006 | Hoffberg ................ | G05B 15/02 700/17 |

(Continued)

FOREIGN PATENT DOCUMENTS

| | | |
|---|---|---|
| KR | 100766094 | 10/2007 |
| KR | 20100134469 | 12/2010 |
| KR | 20180084392 | 7/2018 |

OTHER PUBLICATIONS

Extended European Search Report in European Application No. 19188051.7, dated Dec. 3, 2019, 6 pages.

*Primary Examiner* — Marcus T Riley
(74) *Attorney, Agent, or Firm* — Fish & Richardson P.C.

(57) ABSTRACT

Provided is a home appliance and a speech recognition server system, in which a plurality of speech recognition home electronics may perform a command intended by a user without conflicting with one another using artificial intelligence with respect to a speech command of the user and a method for controlling such a home appliance and a speech recognition server system. The present disclosure determines whether a first group to which a control target device belongs is identical to a second group to which a speech recognition device belongs when the control target device is different from the speech recognition device. Then, when the first group is different from the second group, the present disclosure controls an operation of the control target device based on the control command of the user. Accordingly, the user may control the control target device disposed in a space different from another space in which the speech recognition device is disposed.

20 Claims, 17 Drawing Sheets

(51) Int. Cl.
   *G10L 15/30* (2013.01)
   *G10L 13/00* (2006.01)
   *G10L 15/16* (2006.01)
   *G10L 15/08* (2006.01)

(52) U.S. Cl.
   CPC ............. *G10L 15/30* (2013.01); *G10L 15/16* (2013.01); *G10L 2015/088* (2013.01); *G10L 2015/223* (2013.01)

(56) References Cited

U.S. PATENT DOCUMENTS

| | | | |
|---|---|---|---|
| 9,305,554 B2* | 4/2016 | Jagatheesan | G10L 15/183 |
| 9,443,527 B1* | 9/2016 | Watanabe | G10L 15/26 |
| 9,484,030 B1* | 11/2016 | Meaney | H04R 3/005 |
| 9,590,818 B2* | 3/2017 | Capuozzo | H04L 12/2814 |
| 9,916,839 B1 | 3/2018 | Scalise et al. | |
| 10,489,111 B2* | 11/2019 | Jeong | G06N 20/00 |
| 10,573,304 B2* | 2/2020 | Gemmeke | G10L 15/1822 |
| 10,811,000 B2* | 10/2020 | Le Roux | G10L 25/30 |
| 2003/0023435 A1* | 1/2003 | Josephson | G10L 15/26 704/235 |
| 2012/0069131 A1* | 3/2012 | Abelow | G06Q 10/067 348/14.01 |
| 2013/0132094 A1* | 5/2013 | Lim | G10L 15/22 704/275 |
| 2015/0025890 A1* | 1/2015 | Jagatheesan | G10L 15/32 704/255 |
| 2017/0083285 A1 | 3/2017 | Meyers et al. | |
| 2018/0061419 A1 | 3/2018 | Casado et al. | |
| 2018/0151177 A1* | 5/2018 | Gemmeke | G10L 15/065 |
| 2018/0285065 A1* | 10/2018 | Jeong | G06F 3/167 |
| 2019/0172466 A1* | 6/2019 | Lee | G06F 40/284 |
| 2019/0318725 A1* | 10/2019 | Le Roux | G10L 17/00 |
| 2020/0035235 A1* | 1/2020 | Lee | G10L 15/1815 |

* cited by examiner

HOME APPLIANCE AND SPEECH RECOGNITION SERVER SYSTEM USING ARTIFICIAL INTELLIGENCE AND METHOD FOR CONTROLLING THEREOF

CROSS-REFERENCE TO RELATED APPLICATION

This application claims the benefit of an earlier filing date and right of priority to Korean Application No. 10-2018-0087782, filed on Jul. 27, 2018, the disclosure of which is incorporated herein by reference in its entirety.

TECHNICAL FIELD

A home appliance and a speech recognition server system, in which a plurality of speech recognition home electronics may perform a command intended by a user without conflicting with each other with respect to speech command of the user, and a method for controlling such a home appliance and a speech recognition server system is disclosed herein.

BACKGROUND

Home appliances used in a predetermined space such as home or offices, and the like perform their own functions and operations. Such home appliances may include washing machines, dryers, air conditioners, robot cleaners, air cleaners, refrigerators, oven ranges, water purifiers, and the like.

In order to control an operation of the home appliances, a user may use a button provided on a main body of the home appliances. However, in order to press the button to control the operation of the home appliance, the user needs to move directly to the home appliance.

At this time, the user may use a remote control device, for example, a remote controller that may remotely control the operation of the home appliance. However, when the respective home appliances include the respective remote control devices, it is inconvenient to find the remote control device with respect to the desired home appliance among a plurality of remote control devices.

In order to solve this inconvenience, recently, home appliances use speech recognition technology capable of controlling the operation based on speech of a user.

However, the technology has a limitation that a control target device disposed in a place other than the current position of the user may not be controlled.

Further, the technology has a problem that all speech recognition devices may respond to one command, when the plurality of speech recognition devices are arranged in the same place. Therefore, there is a problem that the control operation intended by the user is not performed properly.

Further, for the control of the speech recognition, the technology has inconvenience that the user may explicitly utter the name of a particular product, which is previously stored by a manufacturer.

Further, in order to control the speech recognition, the technology has an inconvenience that the user may clearly select a particular product so as to be controlled.

SUMMARY

The present disclosure provides a home appliance and a speech recognition server system that control a control target device disposed in a space different from another space where a speech recognition device that recognizes speech of a user is disposed and a method for controlling such a home appliance and a speech recognition server system.

The present disclosure further provides a home appliance and a speech recognition server system that does not allow controlling of the control target device disposed in the same space as a speech recognition device that recognizes speech of a user and a method for controlling such a home appliance and a speech recognition server system.

The present disclosure also provides a home appliance and a speech recognition server system capable of controlling a control target device based on a name or a nickname designated by a user and a method for controlling such a home appliance and a speech recognition server system.

The present disclosure also provides a home appliance and a speech recognition server system capable of controlling a control target device based on a specialized control command only applied to particular home electronics and a method for controlling such a home appliance and a speech recognition server system.

The objects of the present disclosure are not limited to the above-mentioned objects, and the other objects and advantages of the invention, which are not mentioned, may be understood by the following description, and more clearly understood by the implementations of the present disclosure. It will be also readily understood that the objects and the advantages of the present disclosure may be implemented by means defined in the appended claims and a combination thereof.

One general aspect of the present disclosure, there is provided a home appliance and a speech recognition server system and a method for controlling such home appliance and speech recognition server system. The home appliance and the speech recognition server system and the method for controlling such home appliance and speech recognition server system determine whether a first group to which a control target belongs is identical to a second group to which a speech recognition device belongs when the control target device is different from the speech recognition device. Then, when the first group is different from the second group, the present disclosure controls the operation of the control target device based on a control command. Accordingly, the user may control the control target device disposed in a space different from another space where the speech recognition device is disposed.

Another general aspect of the present disclosure, there is provided a home appliance, a speech recognition server system, and a method for controlling such home appliance and speech recognition server system. The home appliance, the speech recognition server system, and the method for controlling such home appliance and speech recognition server system determine whether the first group to which the control target device belongs is identical to the second group to which the speech recognition product belongs when the control target device is different from the speech recognition device. Then, when the first group is identical to the second group, the present disclosure controls the speech recognition device to ignore the control command of the user. As a result, the present disclosure may prevent the control of the control target device from being repeated two or more times by the plurality of speech recognition devices.

Another general aspect of the present disclosure, there is provided a home appliance, a speech recognition server system, and a method for controlling such home appliance and speech recognition server system. The home appliance, the speech recognition server system, and the method for controlling such home appliance and speech recognition server system receives a name or a nickname capable of identifying the home appliance the home appliance includes in advance and stores information on the inputted name or nickname. Then, the present disclosure determines the control target device based on the stored name or nickname. Accordingly, the user may control the control target device with a desired name or nickname.

Another general aspect of the present disclosure, there is provided a home appliance and a speech recognition server system and a method for controlling such a home appliance and a speech recognition server system. The home appliance and the speech recognition server system and the method for controlling such a home appliance and a speech recognition server system may determine the control target device based on a specialized control command when a control command inputted from a user is a specialized control command. As a result, the user may control a device without designating the control target device.

Another general aspect of the present disclosure, there is provided a home appliance and a speech recognition server system and a method for controlling such a home appliance and a speech recognition server system. The home appliance and the speech recognition server system and the method for controlling such a home appliance and a speech recognition server system may include remotely controlling the control target device disposed in a space different from another space where the speech recognition device that recognizes the speech of the user is disposed. At this time, the speech recognition product may notify the user of the control result of the control target device through speech. As a result, the user may easily control the home appliances disposed in another space and immediately identify the control results. Therefore, a user convenience to use a plurality of home appliances may be improved.

Another general aspect of the present disclosure, there is provided a home appliance and a speech recognition server system and a method for controlling such a home appliance and a speech recognition server system. In the home appliance and the speech recognition server system and the method for controlling such a home appliance and a speech recognition server system, the control of the control target device disposed in the space same as the speech recognition device that recognizes the speech of the user may not be allowed. As a result, it is possible to prevent a command conflict or mutual interference between the speech recognition devices from occurring even when a plurality of speech recognition devices is arranged in a space where the user is disposed. Therefore, stability in the operation for the plurality of speech recognition devices may be improved. Further, satisfaction of the user with respect to the use may be improved due to a stable operation.

Another general aspect of the present disclosure, in the home appliance, the speech recognition server system, and the method for controlling such home appliance and speech recognition server system, the user may control the control target device based on the pre-designated name or nickname. As a result, the user may control the particular device with a name easy to remember for the user. Therefore, the user convenience with respect to using the speech recognition device may be improved. Further, when the user utters the nickname of the home appliance, affection of the user with respect to the home appliance and satisfaction of the user with respect to using the home appliance may be improved.

Another general aspect of the present disclosure, according to the present disclosure, in the home appliance, the speech recognition server system, and the method for controlling such home appliance and speech recognition server system, the user may control the control target device with the specialized control command only applied to the specific home appliances. As a result, as the user does not need to utter the name of the control target device, the length of the control command to control the control target device may be shortened. Therefore, the user may control the control target device with a short length of control command, thereby improving the user convenience. Further, the user may feel that the speech recognition device becomes smarter. Therefore, satisfaction of the user with respect to the device may be improved, and a brand image of the device may also be improved.

The effect of the present disclosure is not limited to the above-mentioned effect, and those skilled in the art of the present disclosure can easily understand various effects of the present disclosure based on the disclosure of the present disclosure.

DETAILED DESCRIPTION

Figure 1:
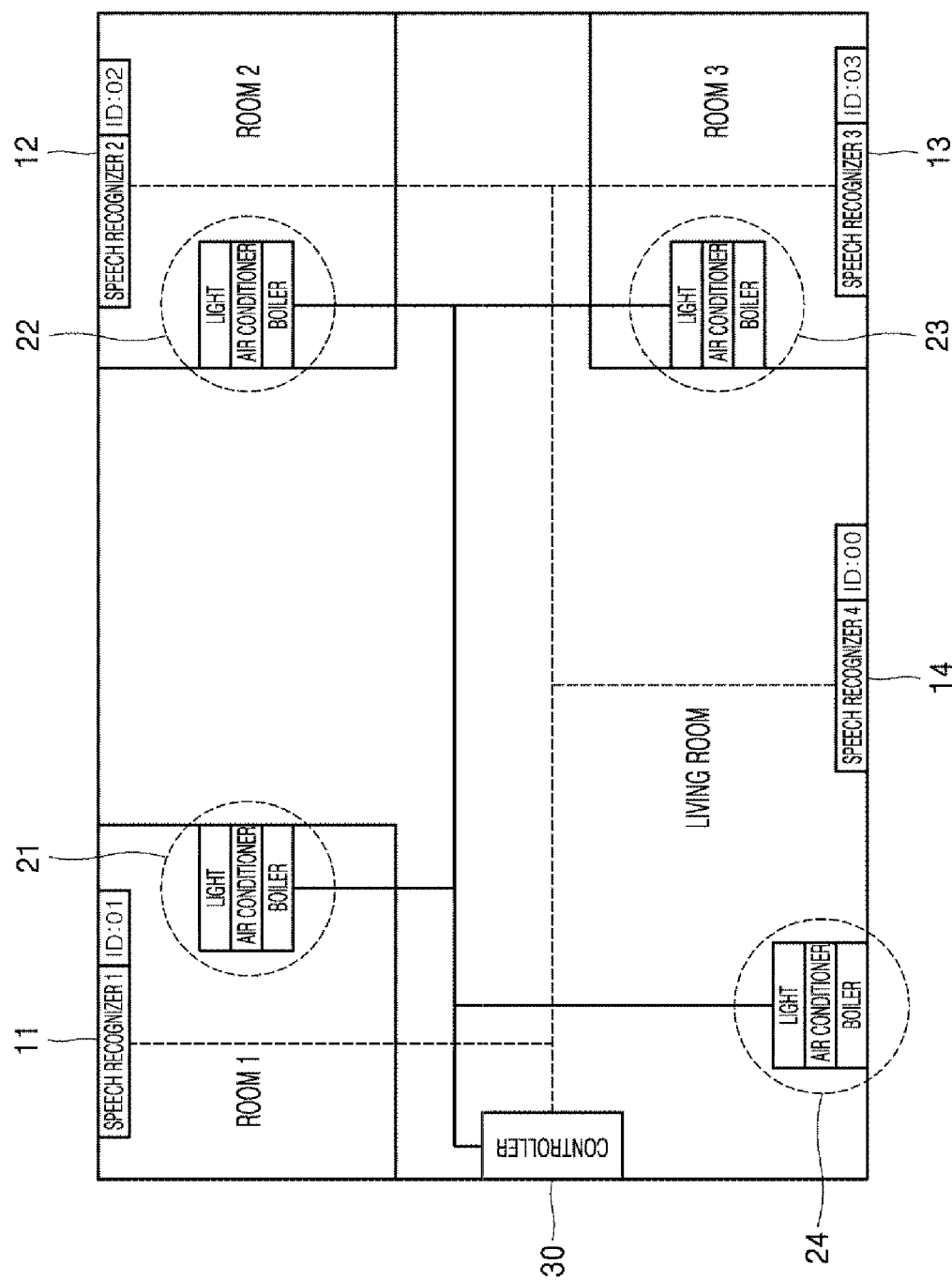
FIG. 1 shows an operation of a home network system that uses a speech recognition technology.

The advantages and features of the present disclosure and a method of achieving them will become apparent with reference to the implementations described in detail below with reference to the accompanying drawings. However, the present disclosure should not be construed as limited to the implementations set forth herein and may be implemented in many different manners. Rather, these implementations are provided so that this disclosure will be thorough and complete, and will fully convey the scope of the invention to those skilled in the art. The present disclosure is defined by the scope of the claims. Like reference numerals refer to like elements throughout the specification.

Unless defined otherwise, all terms (including technical and scientific terms) used herein may be used in a sense commonly understood by the person skilled in the art to which the present disclosure pertains. Also, commonly used predefined terms are not ideally or excessively interpreted unless explicitly defined otherwise.

Further, with respect to implementation of the present disclosure, the present disclosure may be described by subdividing an individual component, the components of the present disclosure may be implemented within a device or a module, or a component of the invention may be implemented by being divided into a plurality of devices or modules.

Hereinafter, a home network system using a speech recognition technology will be described.

FIG. 1 shows an operation of a home network system using a speech recognition technology.

Referring to FIG. 1, the home network system 1 includes a plurality of speech recognition units 11, 12, 13 and 14, a plurality of control target devices 21, 22, 23 and 24, and a controller 30. At this time, the plurality of speech recognition units 11, 12, 13, and 14 and the plurality of control target devices 21, 22, 23, and 24 are arranged in different areas from one another, respectively.

For example, the first speech recognition unit 11 and the first control target device 21 may be arranged in 'room 1', the second speech recognition unit 12 and the second control target device 22 may be arranged in 'room 2'.

At this time, different identifiers, for example, ID, are provided to the respective speech recognition units 11, 12, 13, and 14. The controller 30 may control an operation of the control target devices 21, 22, 23, and 24 based on the ID of the speech recognition units 11, 12, 13, and 14 to which a speech command is inputted.

For example, if light is installed in two places such as room 1 and the living room, the user may select the place of the control target device that is required to be controlled and utter the instructions, for example, "turn on the light in the room 1", "turn off the light in the room 1", "brighten the light in the living room", and "darken the light in the living room".

However, the home network system of FIG. 1 may select a place where a speech command is input based on the IDs of the speech recognition units 11, 12, 13, and 14. Therefore, when a plurality of the same control target devices are installed in the house, the user may control the control target device installed at a current position, even if the current position is not uttered.

Hereinafter, according to some implementations of the present disclosure, a home appliance and a speech recognition server system and a method for controlling the home appliance and the speech recognition server system will be described with reference to FIG. 2 to FIG. 17.

Figure 2:
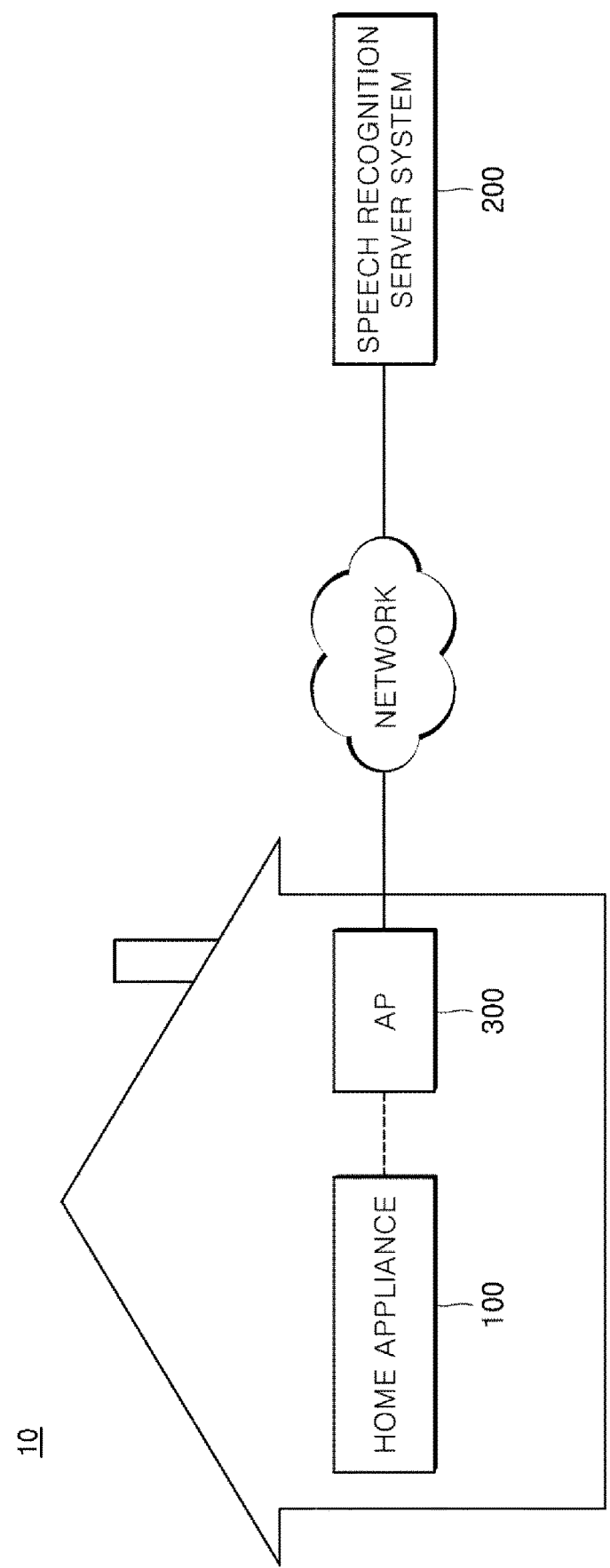
FIG. 2 is a schematic view of a home appliance and a speech recognition server system according to an implementation of the present disclosure.
Figure 3:
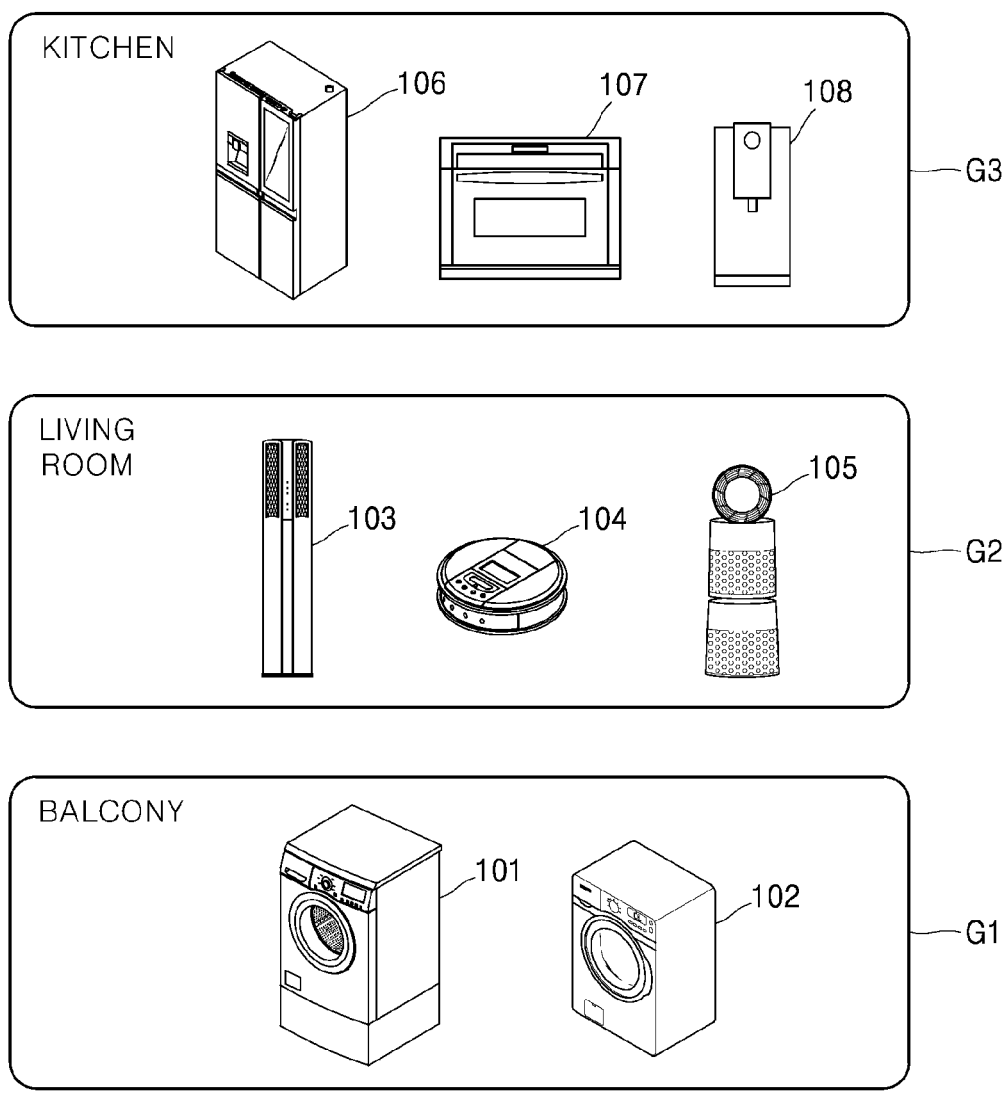
FIG. 3 shows home electronics which includes the home appliance of FIG. 2.

FIG. 2 is a schematic view of a home appliance and a speech recognition server system according to an implementation of the present disclosure. FIG. 3 shows home electronics which include the home appliance of FIG. 2.

Referring to FIG. 2, according to an implementation of the present disclosure, a smart home system 10 may include a home appliance 100 and a speech recognition server system 200. The home appliance 100 may communicate with other electronic devices or network using a communication module or Access Point (AP) 300. The speech recognition server system 200 may use artificial intelligence and may include a plurality of servers to recognize speech and control home electronics.

Specifically, referring to FIG. 3, a home appliance 100 may include a washing machine 101, a dryer 102, an air conditioner 103, a robot cleaner 104, an air purifier 105, a refrigerator 106, an oven range 107, and a water purifier 108. However, this is merely an example, and the home appliance 100 may include various types of home appliances.

At this time, the components of the home appliance 100 may be classified into different groups from one another according to the positions at which the components of the home appliance 100 are arranged in the house.

For example, the washing machine 101 and the dryer 102 arranged in the balcony, or veranda/terrace, may be designated as a first group G1. The air conditioner 103, the robot cleaner 104, and the air cleaner 105 arranged in the living room may be designated as a second group G2. Further, the refrigerator 106, the oven range 107, and the water purifier 108 arranged in the kitchen may be designated as a third group G3. However, this is only one example, and the components of the group and the home appliances in each group may be changed and implemented.

At this time, the number of groups and the home appliances included in each group may be preset by the user. Further, the user may change the number of groups and a configuration of the home electronics included in each group using a user terminal. At this time, the user terminal may provide the user with an interface, UX/UI, that may change the number of groups and the configuration of home electronics included in each group. A detailed description thereof will be described later with reference to FIG. 16.

Each of the home electronics included in the home appliance 100 may include a communication module therein and may communicate with the electronic devices inside/outside of the smart home system 10.

At this time, the smart home system 10 may further include an access point (AP) device. The home appliance 100 may access a wireless network through the AP device 300.

The AP device 300 allocates a wireless channel according to a predetermined communication method to each electronic device included in the home appliance 100. The predetermined communication method may be a Wi-Fi communication method. With respect to the above, the communication module provided by the home appliance 100 may be a Wi-Fi communication module, but the present disclosure is not limited to the communication method. For example, the home appliance 100 may use an NFC module, a zigbee communication module, and a Bluetooth™ communication module, and the like.

The home appliance 100 may be connected to a server included in the speech recognition server system 200, an external server, or a user terminal through the AP device 300. As a result, services such as remote monitoring, remote control, and the like of the home appliance 100 may be provided to the user.

In other words, the user may identify information on the home appliance 100 in the smart home system 10 or control an operation of the home appliance 100 using the user terminal.

According to the implementation of the present disclosure, the home appliance 100 may receive a speech command of the user. Then, the speech recognition server system 200 may analyze the speech command of the user received from the home appliance 100 to determine a control target device and a control command intended by the user. Subsequently, the speech recognition server system 200 may control the determined control target device based on the control command of the user.

Hereinafter, each configuration of the home appliance 100 and the speech recognition server system 200 will be described.

Figure 4:
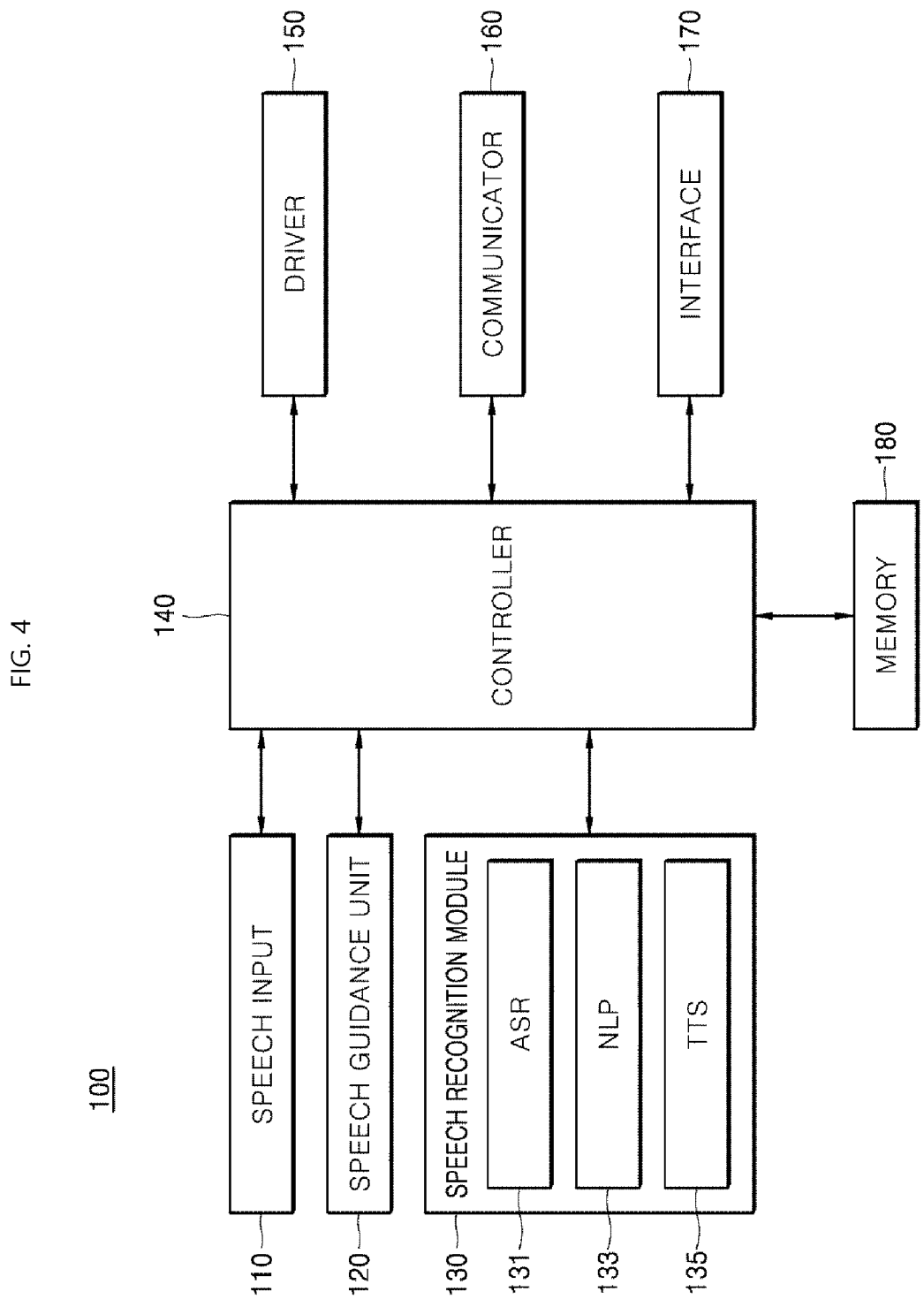
FIG. 4 is a block diagram of a home appliance according to an implementation of the present disclosure.

FIG. 4 is a block diagram of a home appliance according to an implementation of the present disclosure.

Referring to FIG. 4, according to the implementation of the present disclosure, a home appliance 100 includes a plurality of home electronics. Hereinafter, for example, any one of a plurality of home electronics included in the home appliance 100 will be described.

The home appliance 100 includes a speech input 110, a speech guidance unit 120, a speech recognition module 130, a controller 140, a driver 150, a communicator 160, an interface 170, and a memory 180.

The speech command of the user may be input to the speech input 110. To this end, the speech input 110 may include one or more microphones (MIC).

For example, in order to more accurately receive the speech command of the user, the speech input 110 may include a plurality of MICs. At this time, the plurality of MICs may be spaced apart from one another.

The speech input 110 may compare data received from the plurality of MICs therewith and remove the noise therefrom. The speech input 110 may use various noise removing algorithms to remove the noise generated when the speech command of the user is received. Further, the speech input 110 may include the components for processing an audio signal, such as a filter that removes the noise from the audio signal received from each MIC and an amplifier that amplifies the signal outputted by the filter and outputs the amplified signal, and the like. As a result, the speech input 100 may correctly receive the speech command of the user.

The speech guidance unit 120 may convert speech data into sound and output the converted sound. The speech guidance unit 120 may include a component, for example, a speaker, and the like, that converts an electric signal into sound. The speech guidance unit 120 may receive the speech data from a text to speech (TTS) 135 described later.

The speech recognition module 130 receives the speech command of the user from the speech input 110. Then, the speech recognition module 130 extracts a keyword included in the speech command received from the speech input 110. At this time, the extracted keyword may include control target device and a control command.

The control target device represents any one of a plurality of home appliances included in the home appliance 100. For example, the control target device may be any one of a washing machine 101, a dryer 102, an air conditioner 103, a robot cleaner 104, an air purifier 105, a refrigerator 106, and an oven range 107, and a water purifier 108.

Further, the control command represents the instruction of the user to control the operation of the control target device. At this time, the control command may include a common control command commonly applied to a plurality of devices and a specialized control command only applied to a specific device.

For example, "power on" is a common control command. On the other hand, "configure the cold water washing", and "add the dehydration cycle" are the specialized control commands with respect to the washing machine 101.

Additionally, the user may omit the utterance of the control target device using the specialized control command. In this case, the device which received the specialized control command may determine the control target device based on the specialized control command, and control the target device based on the inputted specialized control command. A detailed description thereof will be described below.

The speech recognition module 130 includes an automatic speech recognition (ASR) (hereinafter; ASR) 131, a natural language processing (NLP) or natural language understanding (hereinafter; NLP) 133, and a text to speech (TTS) (hereinafter; TTS) 135.

The ASR 131 converts the speech data received from the speech input 110 into text data. The ASR 131 may be variously expressed as a natural language recognition unit or a speech recognition unit, and the like. The ASR 131 may use various techniques and algorithms to convert speech data into text data. The text data converted by the ASR 131 is transmitted to the NLP 133.

The NLP 133 may determine the speech command by analyzing the natural language processing algorithm stored in advance. The NLP 133 may process a natural language, which is a language that a person routinely uses according to a natural language processing algorithm, and may analyze an intention of a user. That is, the NLP 133 performs the natural language processing on the text data received from the ASR 131, thereby determining a speech command that meets the intention of the user. The NLP 133 may be variously expressed as an intention analysis unit, a natural language processing unit, or a complex sentence recognition unit, and the like. The NLP 133 may use various types of techniques and algorithms to determine the intention of the user.

Specifically, the NLP 133 analyzes the text data received from the ASR 131 and extracts a keyword for the speech command. The keyword includes the above-mentioned control command. The keyword may include name of control target-device.

At this time, the NLP 133 may determine the control target device to which the specialized control command is applied if the control command is a specialized control command. The information on the specific device to which the specialized control command is applied may be stored in the memory 180 and the stored information may be used.

Next, the NLP 133 determines whether the device that receives the speech of the user is identical to the control target device. Then, when the device is different from the control target device, the NLP 133 determines whether a first group to which the device belongs is identical to a second group to which the control target device belongs. When the first group is different from the second group, the NLP 133 transmits a control signal to control the operation of the control target device to the controller 140. The description thereof will be described below in detail with reference to FIGS. 7 to 9.

On the other hand, a determination with respect to comparing the device with the control target device may be performed by the controller 140 instead of the NLP 133.

The TTS 135 converts the text into speech data. The TTS 135 may be variously expressed as a speech synthesizer or a speech converter, and the like. The TTS 135 may use various techniques and algorithms that convert the text into the speech data.

The TTS 135 transmits the converted speech data to the speech guidance unit 120. At this time, the text received by the TTS 135 may include a guide speech about the operation result of the control target device. At this time, the TTS 135 may receive the guide speech from a NLP 133 or a controller 140.

The controller 140 may perform overall control of the components included in the home appliance 100.

For example, the controller 140 may control the operation of a driver 150 based on a control command extracted from the NLP 133. Further, the controller 140 may control other control target devices included in the home appliance 100 based on the control command.

Further, the controller 140 may provide predetermined information to the user through visual or auditory means in each step of recognizing speech and controlling the home appliance.

For example, the controller 140 may display visual information on the speech recognition process and the home appliance control process on the interface 170. In addition, the controller 140 may provide auditory information on the process of recognizing the speech and the process of controlling the home appliance through the speech guidance unit 120.

The driver 150 performs a specific operation implemented by the home appliance 100. The operation of the driver 150 may be performed differently for each home electronics.

For example, when the home appliance 100 is a washing machine 101, the driver 150 may include a drum or a tub and a motor that rotates the drum or the tub.

As another example, when the home appliance 100 is a refrigerator 106, the driver 150 may include a refrigerating compartment driver that operates a fan for the refrigerating compartment to supply the cooled air to a refrigerating compartment, a freezer compartment driver that operations a fan for freezer compartment to supply the cooled air to a freezer compartment, and a compressor driver that operates a compressor to compress the refrigerant, and the like.

As another example, when the home appliance 100 is a oven range 107, the driver 150 may include a microwave driver that outputs a microwave into a cavity, and the like. However, these are merely some implementations, and the present disclosure is not limited thereto.

The communicator 160 includes one or more communication modules. As a result, the communicator 160 may wirelessly communicate with other electronic devices to transmit and receive various signals to and from other electronic devices. For example, the communicator 160 may exchange data with a separate server using a wireless network.

The interface 170 may include a plurality of operation buttons and a display. The user may set an operation option of the product using the plurality of operation buttons provided on the interface 170. In addition, the interface 170 may display information on a command input by the user, the processed result of a command input by the user, an operation state, an error state, and the like. For example, the interface 170 may be a form in which a touch pad and a touch screen are coupled to each other.

The memory 180 records various kinds of information necessary for the operation of the home appliance, and may include a volatile or non-volatile recording medium.

The memory 180 may include an algorithm to recognize the control target device and the control command as a keyword. At this time, the data with respect to the control target device name of the plurality of home electronics included in the home appliance 100 in a form of a database.

Further, the memory 180 may store information on the specific device to which the above-mentioned specialized control command is applied. The relations between the specialized control command and the specific device may be stored in a form of a database. Referring to the database stored in the memory 180, the controller 140 may determine the control target device based on the extracted specialized control command.

Further, the memory 180 may store information on a name or a nickname that may identify each of the home electronics included in the home appliance 100. The controller 140 may determine the control target device based on information on the name or nickname of the home electronics pre-stored in the memory 180.

Further, the memory 180 may store group information on a plurality of home electronics included in the home appliance 100 and information on a representative device of each group. The controller 140 may control the operation of the control target device based on group information pre-stored in the memory 180 and the information on the representative devices of each groups.

For reference, the controller 140 of the home appliance 100 may perform machine learning on received speech data. The memory 180 may store data used for the machine learning or the result data, and the like.

In more detail, a deep learning technology, which is a type of machine learning, learns at deep level in multi-steps based on data.

Deep learning may represent a set of machine learning algorithms that extract key data from various kinds of data as it becomes higher step.

The deep learning structure may include an artificial neural network (ANN). For example, the deep learning structure may include a deep neural network (DNN) such as a convolutional neural network (CNN), a recurrent neural network (RNN), and a deep belief network (DBN), and the like.

The controller 140 may use various types of known deep learning structures. For example, the controller 140 may use a structure such as a convolutional neural network (CNN), a recurrent neural network (RNN), and a deep belief network (DBN), and the like.

Specifically, the convolutional neural network (CNN) is a model that simulates a brain function of a person, which is made based on an assumption that extracts the basic features of an object when the person recognizes an object and then complex calculation is made in the brain and recognizes the object based on the result thereof.

The recurrent neural network (RNN) may be used for natural language processing, and the like, and may have a structure effective for time-series data processing that changes with time, and may form an ANN structure by stacking layers every moment.

The deep belief network (DBN) is a deep learning structure that is made by stacking restricted boltzman machine (RBM) with many layers, which is a deep learning technique. When the RBM learning is repeated and the predetermined number of layers are formed, the deep belief network (DBN) having the number of layers may be formed.

On the other hand, the ANN learning of the controller 140 may be made by adjusting the weight of an inter-node connection line, i.e., by adjusting the bias value if necessary, so that a desired output is obtained for a given input.

Further, the ANN may continuously update the weight value by learning. Further, a method such as a back propagation, and the like, may be used for the ANN learning.

Meanwhile, the memory 180 may include an ANN pre-learned by machine learning.

That is, according to an implementation of the present disclosure, the home appliance 100 may perform the machine learning-based speech recognition that processes the received speech data as input data. At this time, both of unsupervised learning and supervised learning may be used as a machine learning method of the ANN. Further, the controller 140 may control to update the ANN structure after learning according to the configuration.

In another implementation of the present disclosure, the speech recognition module 130 and the controller 140 may be a separate external server. Hereinafter, a speech recognition server system 200 including a speech recognition server 230 that performs an operation of the speech recognition module 130 and a control server 240 that performs the operation of the controller 140 will be described with reference to FIGS. 5 and 6.

Figure 5:
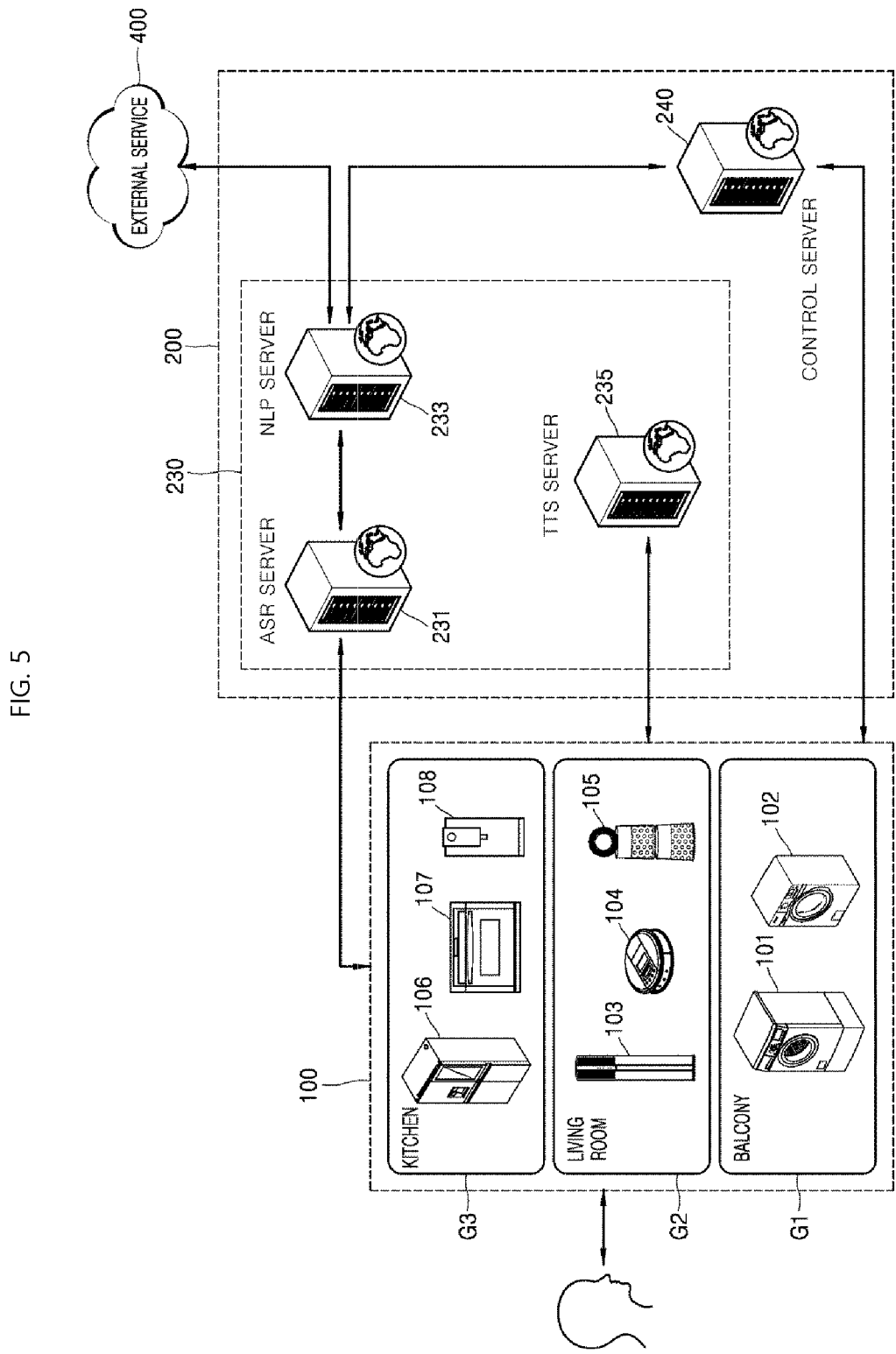
FIG. 5 shows a speech recognition server system that controls a home appliance according to an implementation of the present disclosure.
Figure 6:
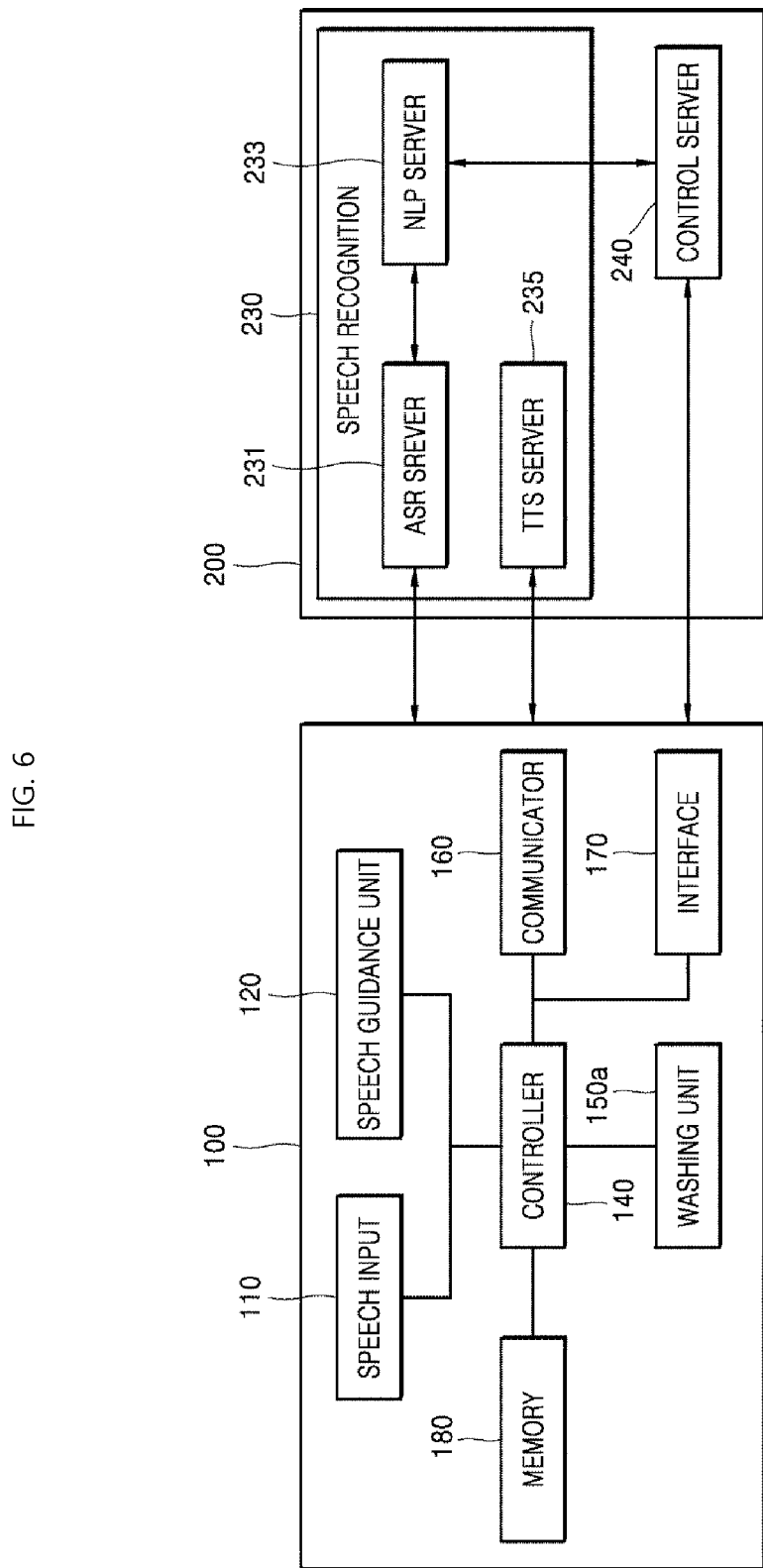
FIG. 6 is a block diagram of relations between the home appliance and a speech recognition server system of FIG. 5.

FIG. 5 shows a speech recognition server system that controls a home appliance according to an implementation of the present disclosure. FIG. 6 is a block diagram of relations between the home appliance and the speech recognition server system of FIG. 5.

Referring to FIGS. 5 and 6, according to another implementation of the present disclosure, a home appliance 100 includes a plurality of home electronics. For example, as shown in FIG. 4, any one of the plurality of home electronics included in the home appliance 100 will be described.

The home appliance 100 includes a speech input 110, a speech guidance unit 120, a controller 140, a driver 150, a communicator 160, an interface 170, and a memory 180.

Each component the home appliance 100 includes according to another implementation of the present disclosure may operate substantially the same as each component the home appliance 100 includes according to an implementation of the present disclosure which is described with reference to FIG. 4. Hereinafter, the contents overlapping with the description with reference to FIG. 4 will be omitted and the differences will be mainly described.

A speech recognition server system 200 may exchange data with the home appliance 100 through a wireless communication network. Further, the speech recognition server system 200 may control an operation of the home appliance 100.

The speech recognition server system 200 may include a speech recognition server 230 and a control server 240.

The speech recognition server 230 may include an ASR server 231, an NLP server 233, and a TTS server 235. The speech recognition server 230 may operate substantially the same as the above-mentioned speech recognition module 130 the home appliance 100 includes according to the implementation.

Specifically, the ASR server 231 may receive speech data generated from a speech input 110 through a communicator 160. The ASR server 231 may convert received speech data into text data. The ASR server 231 may be variously expressed as a natural language recognition server or a speech recognition server, and the like. The ASR server 231 may use various techniques and algorithms to convert speech data into text data. The converted text data may be transmitted to the NLP server 233.

The NLP server 233 may process a natural language, which is a language that a person routinely uses according to a natural language processing algorithm, and may analyze intent of the user. That is, the NLP server 233 may perform the natural language processing on the text data received from the ASR server 231 to determine a speech command that meets intent of the user. At this time, the NLP server 233 may be variously expressed as an intention analysis server, a natural language processing server, or a complex sentence recognition server, and the like. The NLP server 233 may use various techniques and algorithms to determine the intent of the user.

At this time, the NLP server 233 may analyze the text data received from the ASR server 231 and extract a keyword for the speech command. The keyword includes the above-mentioned control target device and control command.

At this time, the NLP server 233 may determine the control target device to which a specialized control command is applied when the control command is the specialized control command. That is, the user may omit an utterance of the control target device using the specialized control command.

Then, the NLP server 233 determines whether the device that receives the speech of the user is identical to the control target device. Then, when the device is different from the control target device, the NLP server 233 determines whether a first group to which the device belongs is the same as a second group to which the control target device belongs. Then, when the first group is different from the second group, the NLP server 233 transmits a control signal to control the operation of the target device to a control server 240.

However, the operation of determining whether the first group is different from the second group by the NLP server 233 may be performed by the control server 240. The description thereof will be described in detail with reference to FIGS. 7 to 10 below.

Additionally, the NLP server 233 may communicate with an external service server 500. For example, if a speech command of the user is a command that requests information such as the weather, the stock, the news, and the like, the NLP server 233 may request the related information to a server that provides the service. Information received from the external service server 400 to the NLP server 233 may be transmitted to the home appliance 100 or the control server 240.

The TTS server 235 may convert text into speech data. The TTS server 235 may be variously expressed as a speech synthesis server or a speech conversion server, and the like. The TTS server 235 may use various types of techniques and algorithms to convert the text into speech data. The TTS 135 may transmit the converted speech data to a speech guidance unit 120 of a home appliance 100 through the communicator 160. At this time, the text that the TTS server 235 receives may include the guide speech notifying the control result of the control target device. The TTS server 235 may receive the guide speech from the home appliance 100 and provide the converted speech data to the home appliance 100.

The control server 240 may control the operation of the control target device included in the home appliance 100 based on the control command received from the NLP server 233.

For reference, the speech recognition server 230 and the control server 240 may perform machine learning on received speech data and the extracted control target device and the control command. Algorithms and data, and the like, used for the machine learning may be stored in each server and may be used. As the description of the machine learning has been described above, a detailed description will be omitted here.

Meanwhile, unlike the home appliance 100 according to an implementation of the present disclosure described with reference to FIG. 4, the controller 140 of the home appliance 100 according to another implementation of the present disclosure may only perform a general control operation of the components included in the home appliance 100.

For example, the controller 140 may control the operation of each component of the home appliance 100 based on the control signal received from the control server 240. Further, the controller 140 may transmit the speech data received from the speech input 110 to the ASR server 231 through the communicator 160. Further, the controller 140 may transmit the guide speech received from the communicator 160 to the speech guidance unit 120. Further, the controller 140 may notify the user of an operation state of the home appliance 100 through the interface 170.

In summary, according to an implementation of the present disclosure, the above-mentioned method for controlling the speech recognition, i.e. the operation described with reference to FIG. 4, may all be performed by the home appliance 100.

Meanwhile, according to another implementation of the present disclosure, all or some of the above-mentioned method for controlling the speech recognition may be performed by a separate server, i.e., the speech recognition server 230 or the control server 240. At this time, the operations of the speech recognition server 230 and the control server 240 may be performed substantially in the same manner by the speech recognition module 130 and the controller 140 according to the implementation of FIG. 4.

Hereinafter, for convenience of explanation, a method for controlling the speech recognition according to some implementations of the present disclosure will be described based on an implementation including the speech recognition server 230 and the control server 240 shown in FIGS. 5 and 6.

Figure 7:
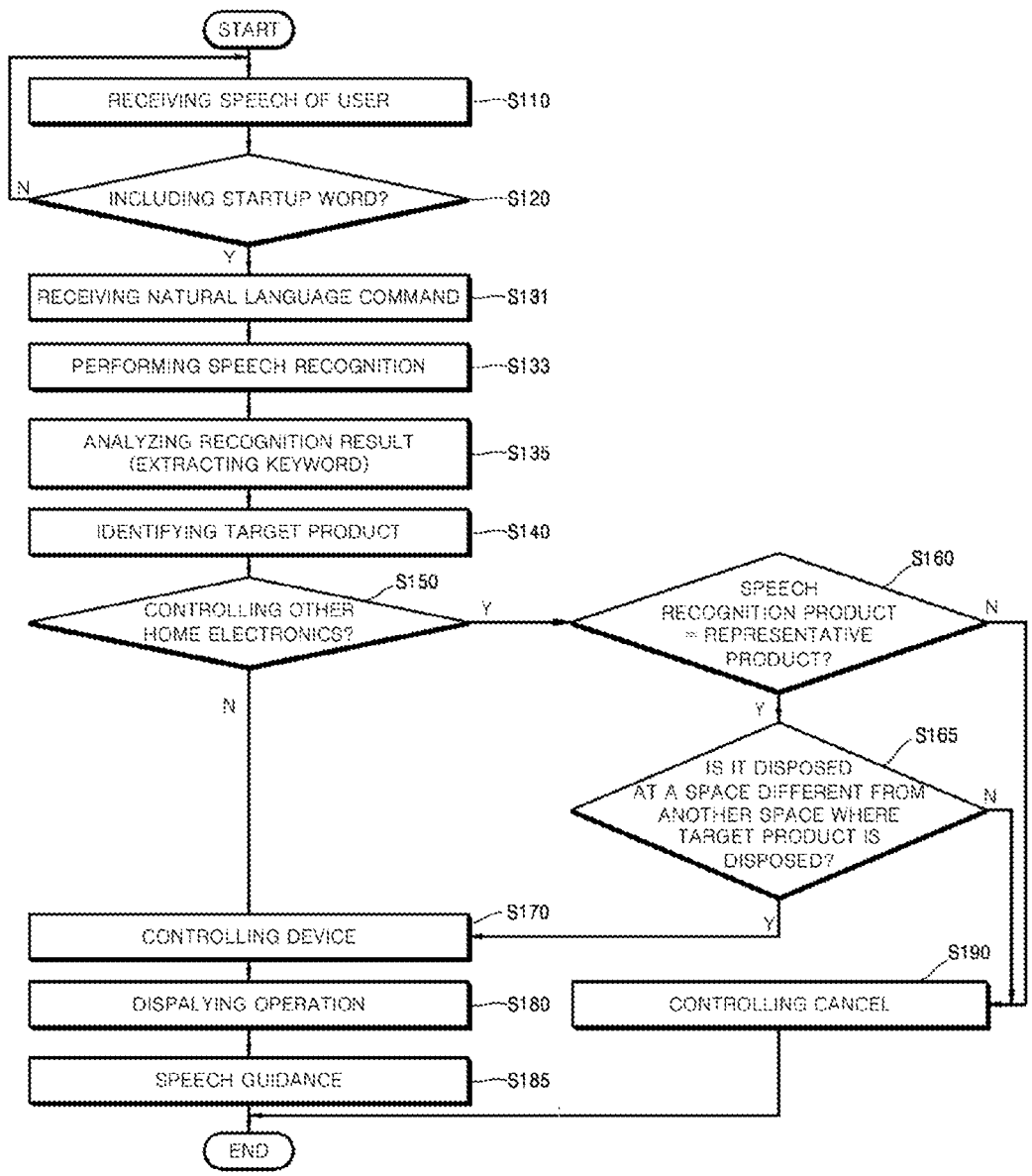
FIG. 7 is a flowchart of a method for controlling speech recognition according to some implementations of the present disclosure.
Figure 8:
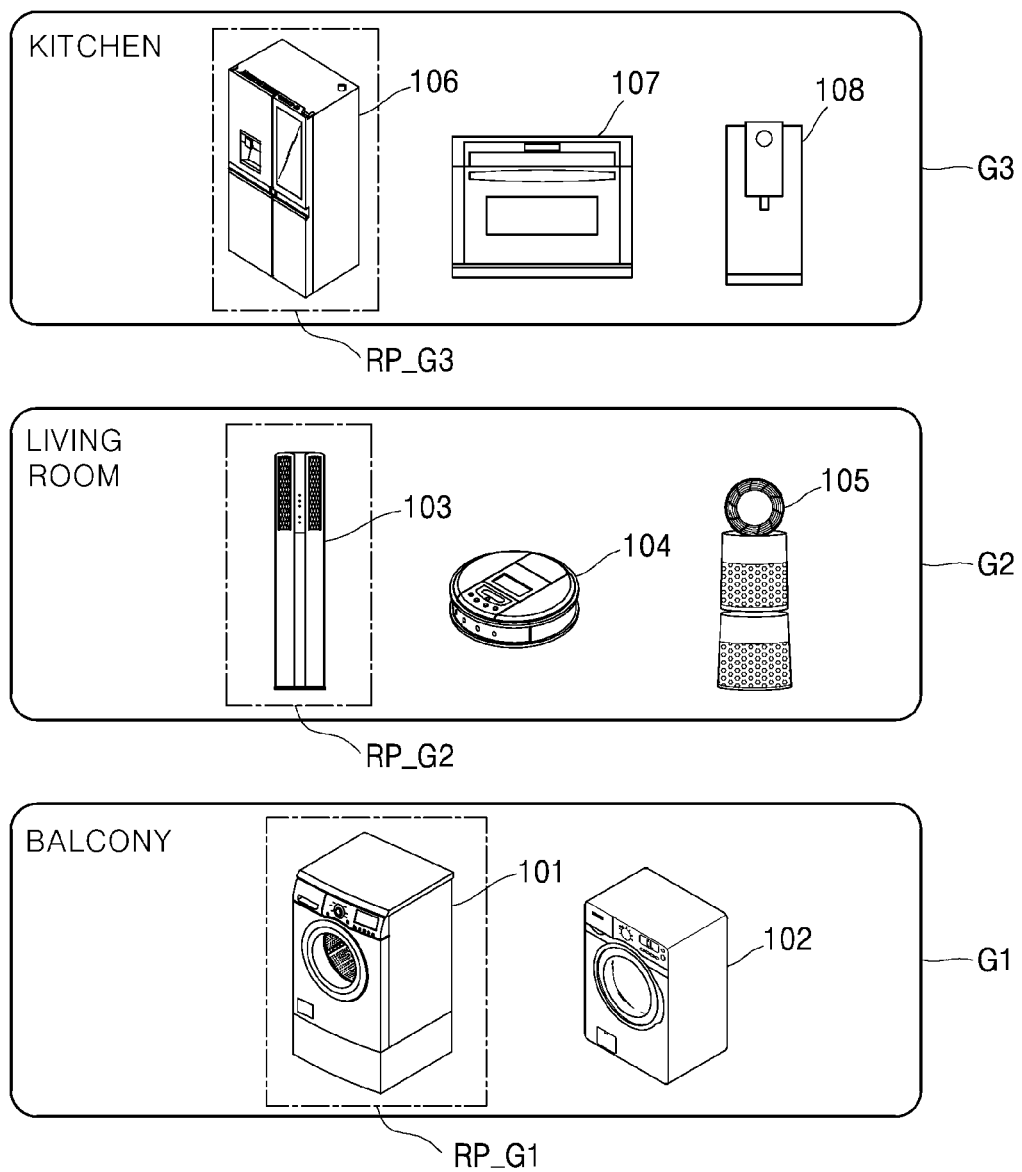
FIG. 8 shows a representative device for each group of a home appliance.

FIG. 7 is a flowchart of a method for controlling speech recognition according to some implementations of the present disclosure. FIG. 8 shows a representative device for each group of home appliances.

Referring to FIG. 7, according to an implementation of the present disclosure, in the method for controlling the speech recognition, a home appliance 100 receives speech of a user S110. Speech data of the user is input to the home appliance 100 from the speech input 100. Hereinafter, for convenience of explanation, home electronics that recognizes speech of the user among a plurality of home electronics included in the home appliance 100 will be defined as 'a speech recognition product'.

The speech data inputted to the speech recognition product may be transmitted to speech recognition server system 200.

Then, the speech recognition server system 200 determines whether the received speech data includes a startup word S120.

The startup word may be set by the manufacturer. For example, the startup word of the speech recognition product may be "Hi, LG". At this time, the startup word may be changed in various ways and set.

Then, when the inputted speech data includes the startup word, the speech recognition server system 200 may control the speech recognition product so as to receive a natural language command from the user S131.

For reference, according to another implementation, the home appliance 100 may perform simple speech recognition, i.e., startup recognition, and high level of speech recognition such as a natural language processing, and the like, may be performed by the speech recognition server system 200.

For example, if a wake up speech command, e.g., "Hi LG", including a pre-set startup word is received, the state of the speech recognition product may be converted into a state to receive the natural language command. In this case, the speech recognition product may only perform a speech recognition process by a speech input of the startup word, and the speech recognition for the subsequent natural language command may be performed by the speech recognition server system 200. That is, as there is a limitation in the system resource of the home appliance 100, the complex natural language recognition and processing may be performed by the speech recognition server system 200.

For reference, a determination of the startup word may be performed by the home appliance 100 and the speech recognition server system 200 doubly. Accordingly, it is possible to reduce erroneous recognition of determining a speech input of the startup word and increase a recognition rate.

Then, when the natural language command is received after the startup word is recognized, an ASR server 231 may perform a speech recognition operation on received speech data S233. The ASR server 231 may convert the received speech data into text data. Converted text data may be transmitted to the NLP server 233.

Then, the NLP server 233 may analyze the result of the speech recognition operation performed by the ASR server 231 S135. That is, the NLP server 233 may extract a keyword for a speech command from received text data. The extracted keyword may include a control target device and a control command.

Then, the NLP server 233 identifies the control target device based on the extracted keyword (S140). At this time, the control target device may be any one of a plurality of home electronics included in the home appliance 100. For example, the control target device may be any one of a washing machine 101, a dryer 102, an air conditioner 103, a robot cleaner 104, an air purifier 105, a refrigerator 106, an oven range 107, and a water purifier 108. That is, when the user directly utters the name of the device, the device may be the control target device.

Further, based on the name or the nickname pre-stored by the user, the NLP server 233 may determine the control target device. The user may set the name or the nickname for the specific device as a word desired by the user, and the NLP server 233 may determine the control target device based on the pre-stored name or nickname. This will be described below with reference to FIG. 17.

On the other hand, when the user does not directly utter the control target device, the NLP server 233 may determine the control target device based on the control command.

Specifically, the control command may include a common control command commonly applied to a plurality of devices, and a specialized control command applied only to a specific device. If the control command is a specialized control command, the NLP server 233 may determine the control target device based on the specialized control command. Accordingly, the user may omit the utterance of the control target device by uttering the specialized control command.

Then, the NLP server 233 transmits the determined control target device and control command to the control server 240.

Then, the control server 240 determines whether the determined control target device is identical to the speech recognition device that recognizes the speech of the user S150. That is, when the user intends to control the speech recognition device, the speech recognition device is identical to the control target device. On the other hand, when the user intends to control a control target device which is not the speech recognition device, the speech recognition device may be different from the control target device. Therefore, the control server 240 determines whether the speech recognition device is identical to the control target device and whether the command of the user enables controlling other electronics.

Then, if the command of the user controls the other home electronics, that is, the speech recognition device is different from the determined control target device, the control server 240 determines whether the speech recognition device is a representative device S160.

The representative devices may be preset one by one for a plurality of groups of home appliances 100.

For example, referring to FIG. 8, in the first group G1 including a washing machine 101 and a dryer 102, a representative product RP_G1 may be set as the washing machine 101. Similarly, in a second group G2 including an air conditioner 103, a robot cleaner 104, and an air cleaner 105, the representative product RP_G2 may be set as the air conditioner 103. Further, in the third group G3 including a refrigerator 106, a oven range 107, and a water purifier 108, the representative product RP_G3 may be set as the refrigerator 106.

The user may change the setting of the group and the representative product for the home appliance 100 using a separate interface. If a representative product is not designated, one product may automatically be designated as a representative product in one group.

In this example, selecting the representative products may prevent the plurality of home electronics arranged in one place and set as the same group from generating the control command many times. By designating the representative product, only one control command is generated in one group. That is, when there is a control target device in a space different from another space in which the speech recognition product is arranged, only control commands generated from the representative product may be performed by a control server 240.

As a result, it is possible to prevent a command conflict or mutual interference between speech recognition products from occurring even when plurality of speech recognition products are arranged in a space where the user is located. Therefore, the stability in the operation for plurality of speech recognition products may be improved.

Then, the control server 240 determines whether a speech recognition product is arranged in a space different from another space where a control target device is disposed (S165). That is, the control server 240 determines whether a group to which the speech recognition product belongs is different from a group to which the control target device belongs.

Then, if the group to which the speech recognition product belongs is different from the group to which the control target device belongs, the operation of the control target device is controlled based on a control command S170.

Then, the control server 240 receives control results for the operation of the control target device.

Then, the control server 240 transmits the control result of the operation of the control target device to the speech recognition device.

Then, the speech recognition product displays the received control result on the interface 170 (S180). Accordingly, the user may confirm the control result of the control target device through the interface 170 provided on the speech recognition product.

Then, the speech recognition device may transmit guide speech including the received control result to a TTS server 235. The TTS server 235 may convert the received guide speech to speech data and transmit the converted speech data to the speech recognition device. The speech recognition device may convert the received speech data into sound by a speech guidance unit 120 and output it S185.

On the other hand, when the speech recognition device is not a representative device, the control server 240 transmits an ignore command (Ignore CMD) to the speech recognition product to ignore a control command S190. Similarly, even when the speech recognition device is arranged in a space different from another space where the control target device is disposed, the control server 240 transmits an ignore command (Ignore CMD) to the speech recognition product.

Additionally, the above-mentioned method for controlling the speech recognition may also be applied to a device that does not have a speech recognition function but may be remotely controlled through the control server 240. At this time, the home appliance 100 may include a device that does not have the function for the speech recognition. Devices with no function for speech recognition may be included in the specific group and may be the remotely controlled control target devices. Accordingly, the speech recognition device may remotely control the device with no function for speech recognition using the method for controlling the speech recognition described above.

Hereinafter, the method for controlling the speech recognition according to some implementations of the present disclosure will be described for each case.

Figure 9:
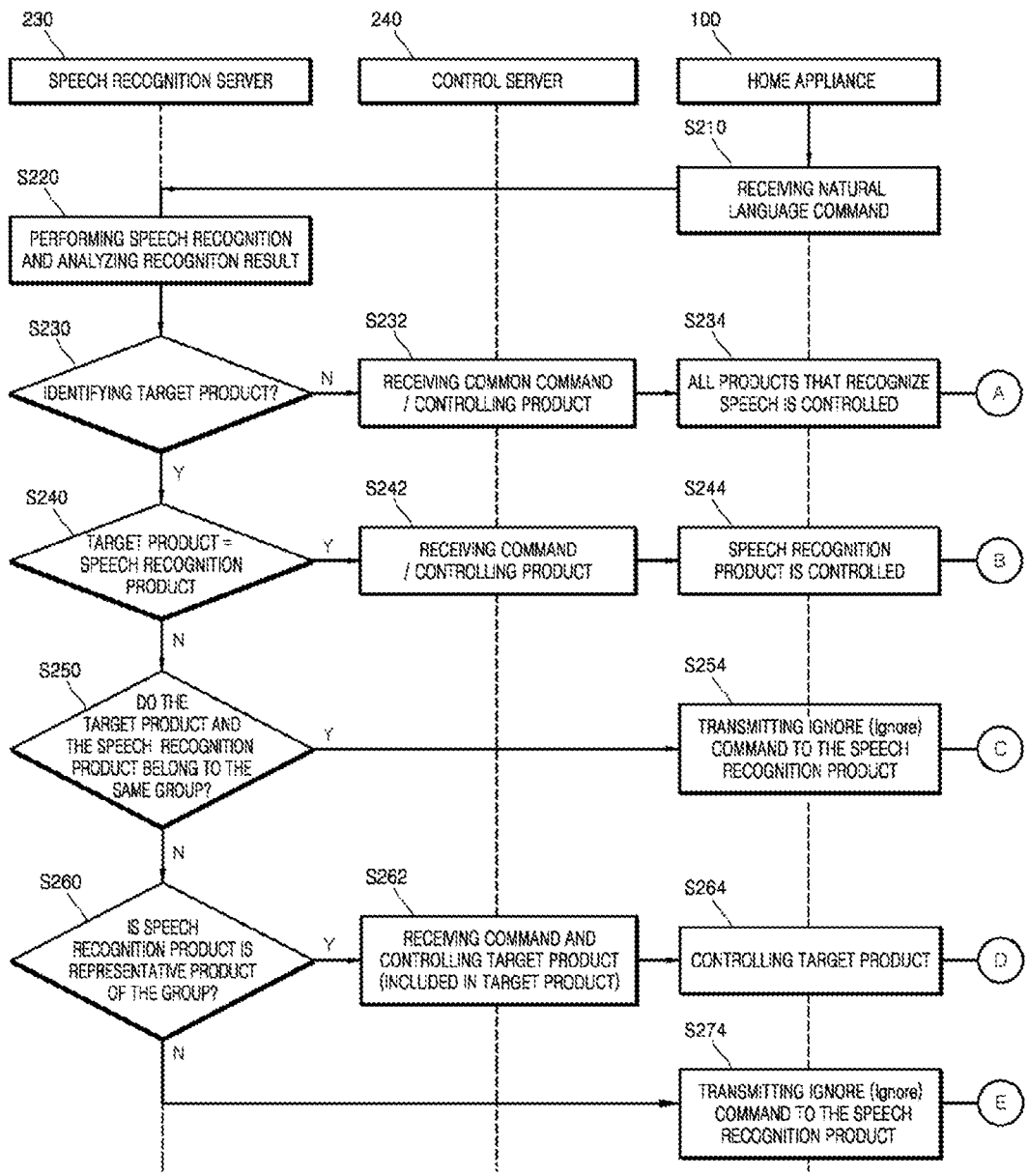
FIG. 9 is a flowchart of a method for controlling speech recognition for each case according to an implementation of the present disclosure.
Figure 10:
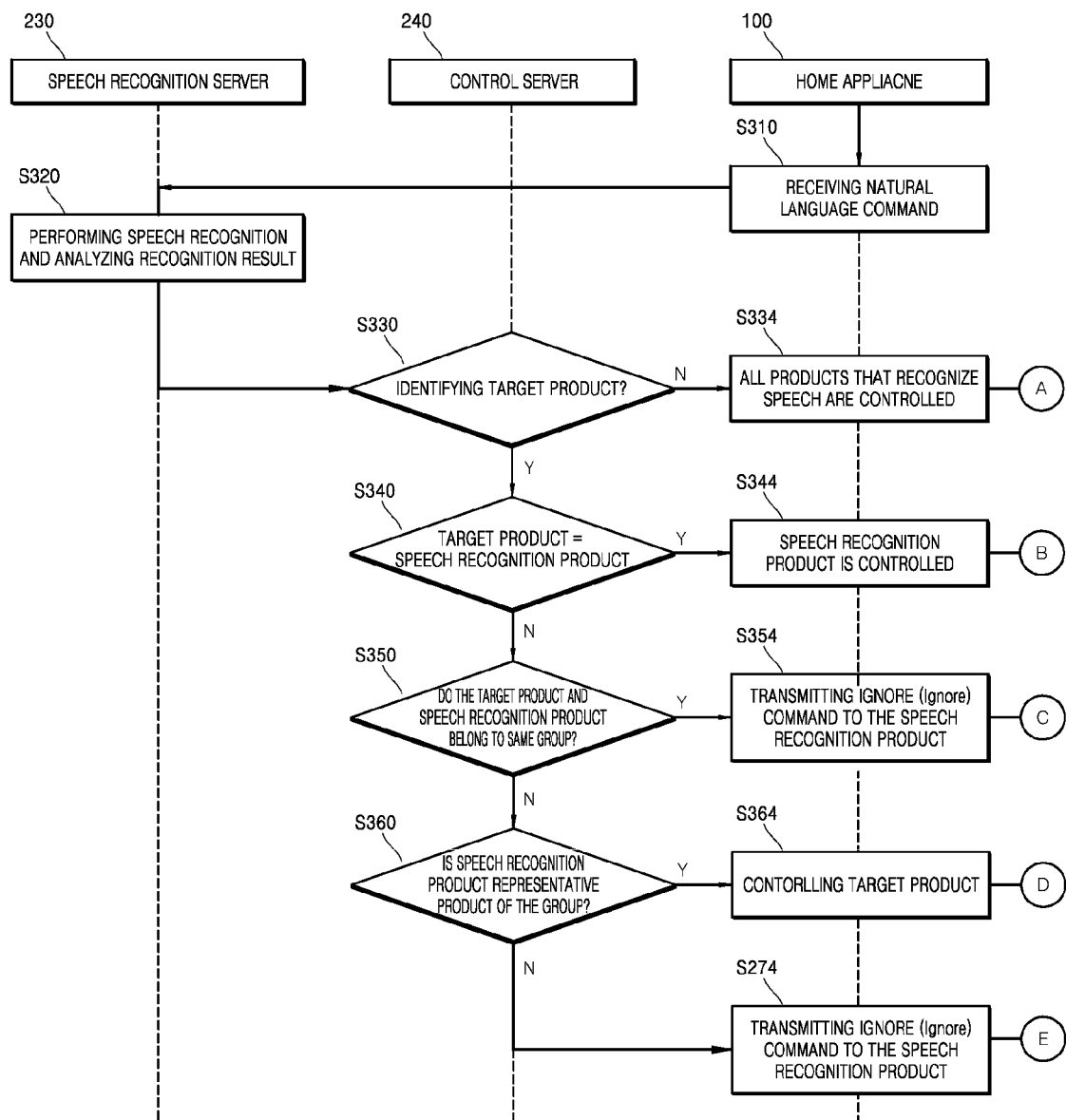
FIG. 10 is a flowchart of a method for controlling speech recognition for each case according to another implementation of the present disclosure.

FIG. 9 is a flowchart of a method for controlling speech recognition for each case according to an implementation of the present disclosure. FIG. 10 is a flowchart of a method for controlling speech recognition for each case according to another implementation of the present disclosure.

Hereinafter, the same contents as those of the method for controlling speech recognition described with reference to FIG. 7 will be omitted, and the differences or features will be mainly described.

Referring to FIG. 9, a home appliance 100 receives speech of a user S210. The home appliance 100 receives speech data of the user from a speech input 110. The speech data inputted to the speech recognition product may be transmitted to a speech recognition server system 200.

Next, a speech recognition server 230 performs a speech recognition operation on the received speech data S220.

Specifically, an ASR server 231 included in the speech recognition server 230 converts the received speech data into text data. The converted text data is transmitted to an NLP server 233.

Then, the NLP server 233 included in the speech recognition server 230 analyzes the result of the speech recognition operation performed by the ASR server 231 S135. That is, the NLP server 233 extracts a keyword for the speech command from the received text data. The extracted keyword may include a control target device and a control command.

Then, the NLP server 233 identifies the control target device based on the extracted keyword S230.

At this time, the NLP server 233 may determine the control target device based on the name or nickname pre-stored by the user. The user may set the name or the nickname for the specific device to a word desired by the user, and the NLP server 233 may determine the control target device based on the pre-stored name or nickname. The description thereof is will be described below with reference to FIG. 17.

Further, when the user does not directly utter the control target device, the NLP server 233 may determine the control target device based on the control command. At this time, the control command may include a common control command commonly applied to a plurality of products and a specialized control command applied only to a specific product.

When the control command is the specialized control command, the NLP server 233 may determine the control target device based on the specialized control command. Accordingly, the user may omit the control target device by uttering the specialized control command.

On the other hand, when the control command is a common control command, the NLP server 233 may not determine the control target device. At this time, the NLP server 233 transmits only the common control command to the control server 240.

Then, the control server 240 controls the speech recognition device based on the received common control command S232. However, the control server 240 may control all devices that recognize the speech of the user based on the common control command S234.

For example, "power on" may be identified as a common control command when the user utters "power on". At this time, the contents with respect to the utterance of the user does not include the control target device, the control server 240 may transmit a control command to turn on the power for all the devices in which the speech of the user is recognized. That is, when the user utters "power on" in the balcony of FIG. 8, both the washing machine 101 and the dryer 102 may be turned on. Hereinafter, this operation case is defined as an "A case".

On the other hand, if the control target device is identified in S230, the NLP server 233 determines whether the speech recognition device is identical to the control target device S240.

Then, if the control target device is identical to the speech recognition device, the control server 240 receives the control target device and control command from the NLP server 233 S242.

Then, the control server 240 controls the control target device based on the control command S244. That is, as the control target device is identical to the speech recognition device, the control server 240 controls the speech recognition device based on the control command.

For example, when the user utters "power on the washing machine" in front of the washing machine 101, both the speech recognition device and the control target device are the washing machine 101. In this case, the control server 240 may control the washing machine 101 to turn on the power. Hereinafter, this operation case is defined as a 'B case'.

Meanwhile, when the control target device is different from the speech recognition product in S240, the NLP server 233 determines whether the group to which the control target device belongs is identical to the group to which the speech recognition product belongs S250.

Then, the group to which the control target device belongs is identical to the group to which the speech recognition device belongs, the NLP server 233 may transmit an ignore command (Ignore CMD) to the speech recognition device to ignore the inputted control command S254.

For example, when the user utters "power on the washing machine" in front of the dryer 102, the speech recognition device is the dryer 102 and the control target device is the washing machine 101. At this time, the group of the dryer 102 is a first group G1, and the group of the washing machine 101 is also a first group G1. In this case, the NLP server 233 may control the dryer 102 to ignore the control command. Hereinafter, this operation case is hereinafter defined as a 'C case'.

Meanwhile, when a group to which the control target device belongs is different from a group to which the speech recognition device belongs in S250, the NLP server 233 determines whether the speech recognition device is a representative device of the group S260.

Then, when the speech recognition device is a representative device of the group, the control server 240 receives the control target device and the control command from the NLP server 233 S262.

Then, the control server 240 controls the control target device based on the control command S264. In this case, as the control target device is arranged in a space different from another space where the speech recognition device is disposed, the control server 240 receives the control result of the operation of the control target device and transmits information on the received control result to the speech recognition device. Then, the speech recognition device outputs information on the received control result through speech.

For example, when the user utters "turn on the air conditioner" in front of the washing machine 101, the speech recognition device is the washing machine 101 and the control target device is the air conditioner 103. At this time, the group of the washing machine 101 is a first group G1, and the group of the air conditioner 103 is a second group G2. Further, the washing machine 101 corresponds to the representative device of the first group G1. In this case, the control server 240 may control the power supply of the air conditioner 103 to be turned on. Then, the control server 240 transmits the control result of the air conditioner 103 to the washing machine 101. The washing machine 101 may output the control result of the air conditioner 103 through speech. Hereinafter, this operation case is hereinafter defined as a 'D case'.

On the other hand, when the speech recognition device is not the representative device of the group in S260, the NLP server 233 may transmit an ignore command (Ignore CMD) to the speech recognition device to ignore the inputted control command S274.

For example, when the user utters "turn on the air conditioner" in front of the dryer 102, the speech recognition device is the dryer 102 and the control target device is the air conditioner 103. At this time, the group of the dryer 102 is the first group G1, and the group of the air conditioner 103 is the second group G2. However, the dryer 102 is not a representative device of the first group G1. In this case, the NLP server 233 may control the dryer 102 to ignore the control command. Hereinafter, this operation case is defined as an "E case".

A method for controlling the speech recognition according to another implementation of the present disclosure shown in FIG. 10 operates substantially in the same manner as the method for controlling the speech recognition according to another implementation of the present disclosure which is described above with reference to FIG. 9.

S330, S340, S350, and S360 shown in FIG. 10 are substantially the same as S230, S240, S250, and S260 described above with reference to FIG. 9. The subject of S230, S240, S250, and S260 is a speech recognition server 230, and the subject of S330, S340, S350, and S360 is a control server 240.

That is, in the implementation in FIG. 10, performing a speech recognition operation to identify a control target device and the control command i.e., S320, is performed by an NLP server 233.

The determination whether the control target device is identified S330, whether the control target device is identical to the speech recognition device S340, whether the control target device and the speech recognition device belong to the same group S350, and whether the speech recognition device is a representative device of the group (S360) may be performed by the control server 240.

Then, the method for controlling a home appliance 100 with respect to each determination is the same as the above-mentioned manner. The repeated description will be omitted.

Hereinafter, according to some implementations of the present disclosure, the method for controlling the speech recognition will be described with specific examples.

Figure 11:
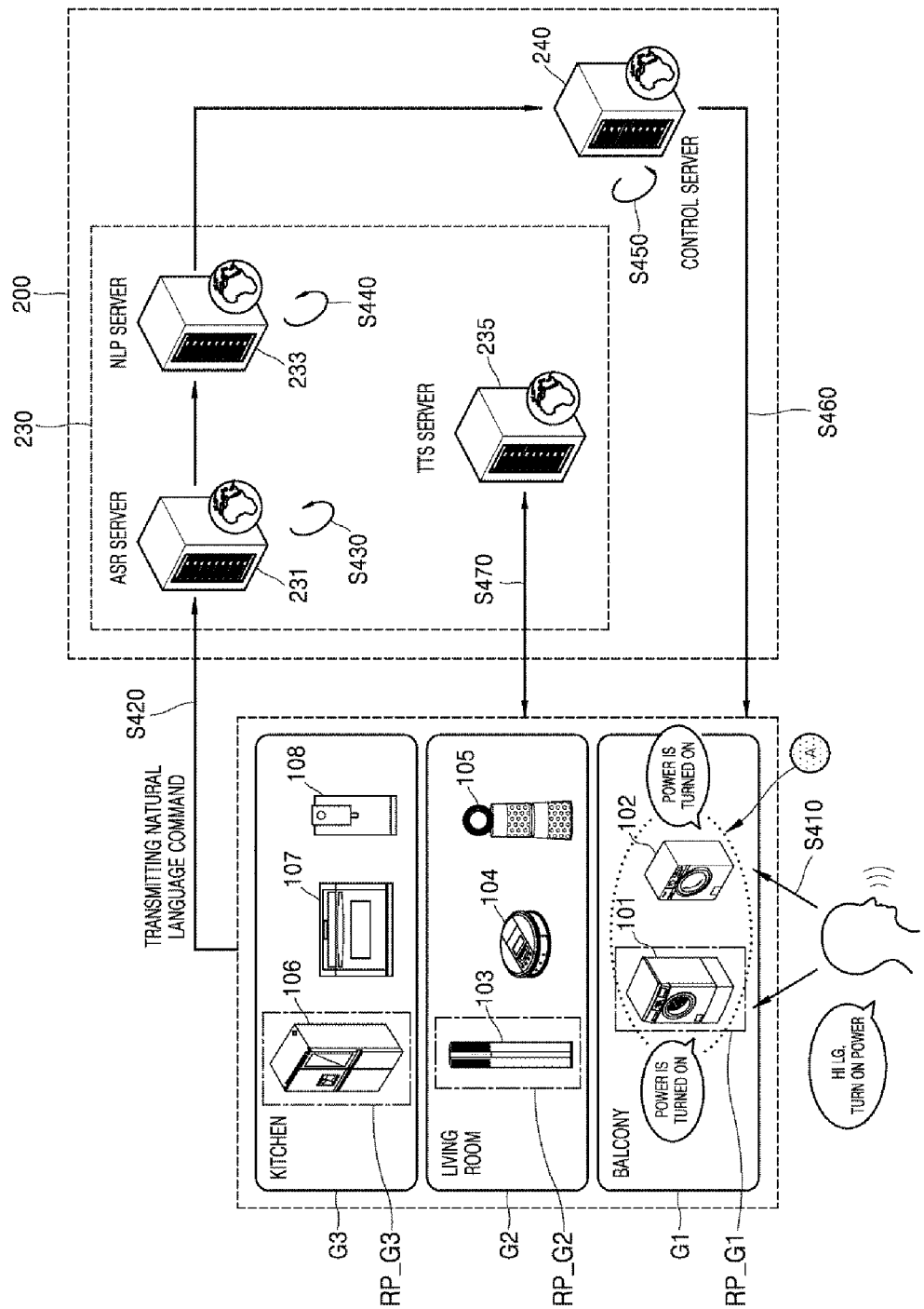
FIG. 11 is a schematic view of a method for controlling speech recognition according a first implementation of the present disclosure.

FIG. 11 is a schematic view of a first implementation of a method for controlling speech recognition according to the present disclosure.

Referring to FIG. 11, a home appliance 100 may receive speech of a user first (S410). The home appliance 100 may receive speech data of the user from a speech input 110. Hereinafter, the case where the user utters "Hi LG, turn on the power" in the balcony will be described as an example of a method for controlling the speech recognition of the present disclosure.

A washing machine 101 and a dryer 102 disposed in the balcony may recognize a startup word from the speech data of the user, respectively. The startup word may be "Hi LG".

For reference, as mentioned above, an operation of recognizing the startup word may be performed by a speech recognition server system 200. Hereinafter, for example, the case where the home appliance 100 recognizes the startup word will be described, for convenience of explanation.

Then, when the startup word is recognized, the home appliance 100 may process the contents that the user utters as a natural language command after the startup word is inputted.

Then, the speech data corresponding to the natural language command may be transmitted to the speech recognition server system 200 S420. At this time, the natural language command may include speech data of "turn on the power".

Then, when the natural language command is received, an ASR server 231 performs a speech recognition operation on received speech data S430. The ASR server 231 may convert the received speech data into text data. The converted text data may be transmitted to an NLP server 233.

Then, the NLP server 233 may analyze the result of a speech recognition operation performed by the ASR server 231 S440. That is, the NLP server 233 may extracts a keyword, that is, a control target device or a control command, for a speech command from received text data. At this time, a control command of the keywords extracted from a natural language command may be 'turn on the power'. Then, the NLP server 233 transmits the control command to a control server 240. At this time, the NLP server 233 transmits the fact that the extracted keyword does not include the control target device to the control server 240.

Then, as there is no control target device in the extracted keyword, the control server 240 determines whether the received control command is a common control command or a specialized control command S450. At this time, the control server 240 may determine the kind of the control command based on a database in which the common control command and the specialized control command are stored. In the implementation, the control command of 'power on' corresponds to the common control command. Therefore, the implementation corresponds to the above-described 'A case'.

Then, the control server 240 controls all products in which the speech is recognized based on the control command (S460). In the implementation, both the washing machine 101 and the dryer 102 that recognize the speech of the user correspond to the speech recognition products.

Accordingly, the control server 240 may simultaneously transmit the control command to turn on the power to the washing machine 101 and the dryer 102.

Then, the washing machine 101 and the dryer 102 may output a guide speech notifying that the power is turned on by the speech guidance unit 120, respectively. At this time, the washing machine 101 and the dryer 102 may receive the guide speech of "power is turned on" from the control server 240.

Then, the washing machine 101 and the dryer 102 transmit the guide speech to a TTS server 235. Subsequently, the TTS server 235 converts the received guide speech into speech data and transmits the converted speech data back to the washing machine 101 and the dryer 102 S470.

Then, the washing machine 101 and the dryer 102 convert the received speech data into sound by the speech guidance unit 120 and output the converted sound. That is, the washing machine 101 and the dryer 102 may output the guide speech that "the power is turned on" through sound, respectively.

As a result, when the user utters the common control command, the user may learn that all home electronics that recognize the speech operate. Therefore, based on this experience, the user may simultaneously control the plurality of home electronics using the common control command as necessary.

Figure 12:
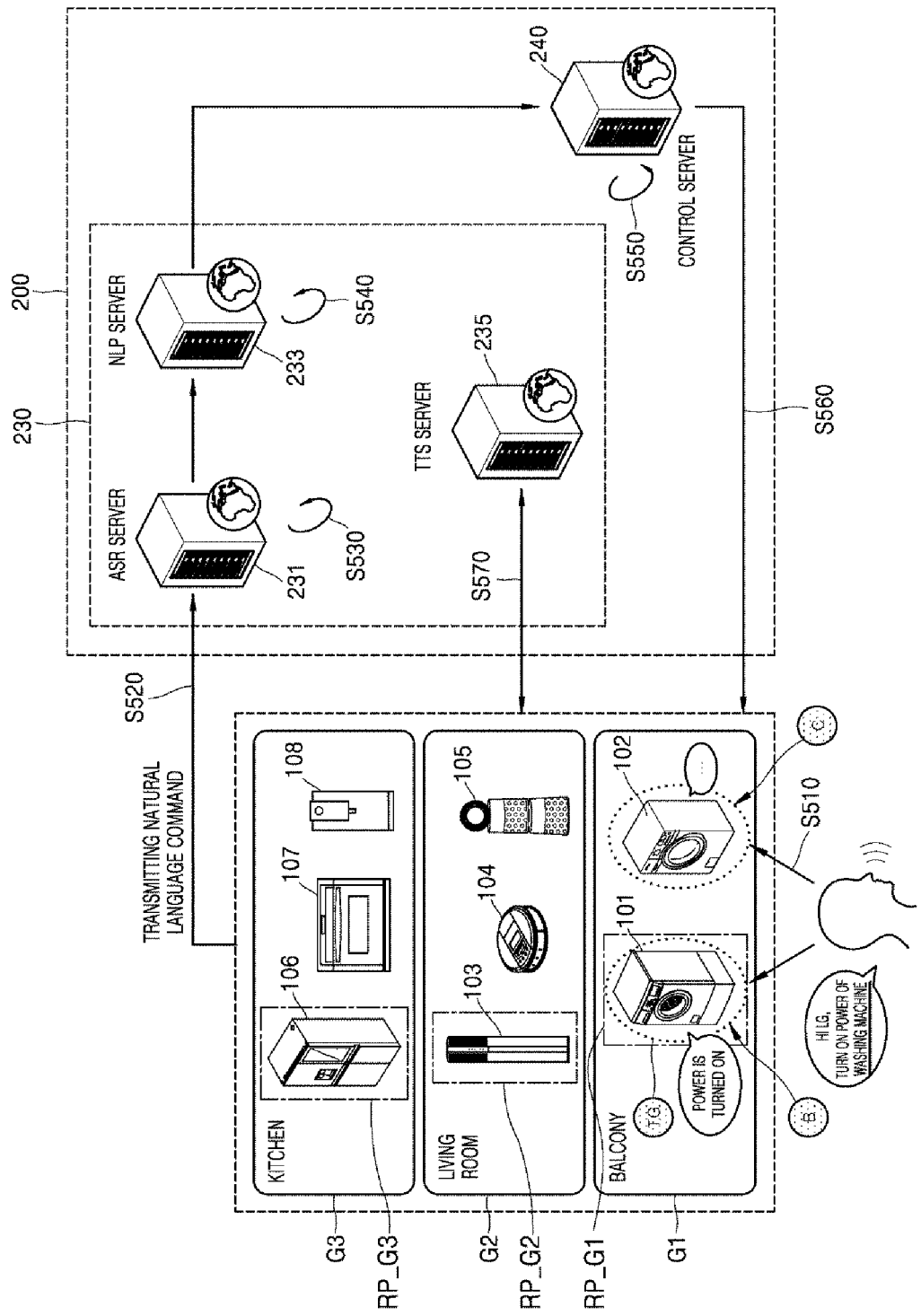
FIG. 12 is a schematic view of a method for controlling speech recognition according to a second implementation of the present disclosure.

FIG. 12 is a schematic view of a method for controlling speech recognition of according to a second implementation present disclosure. Hereinafter, the contents overlapping with the above implementation will be omitted, and differences will be mainly described.

Referring to FIG. 12, a home appliance 100 receives speech of a user S510. The home appliance 100 receives speech data of the user from a speech input 110. Hereinafter, the case where the user utters "Hi LG, turn on the washing machine" in the balcony will be described as an example of a method for controlling the speech recognition.

The washing machine 101 and the dryer 102 disposed in the balcony may recognize the startup word from the speech data of the user, respectively. The startup word may be "Hi LG".

Then, when the startup word is recognized, the home appliance 100 may process the contents that the user utters as a natural language command after the startup word is inputted.

Then, the speech data with respect to the natural language command may be transmitted to a speech recognition server system 200 S520. At this time, the natural language command may include speech data of "turn on the washing machine".

Then, when the natural language command is received, an ASR server 231 performs a speech recognition operation on the received speech data (S530). The ASR server 231 converts the received speech data into text data. The converted text data is transmitted to an NLP server 233.

Then, the NLP server 233 analyzes the result of a speech recognition operation performed by the ASR server 231

S540. That is, the NLP server 233 extracts a keyword, i.e., a control target device or a control as an instruction, for a speech command from the received text data. At this time, among the keywords extracted from the natural language command, the control target device (TG) may be a 'washing machine' and the control command may be 'power on'.

Then, the NLP server 233 transmits information on a control target device and a control command to a control server 240.

Then, the control server 240 determines whether the control target device TG is the identical to the speech recognition product S550. At this time, the control target device TG may be the washing machine 101 and the speech recognition product may be the washing machine 101 and the dryer 102.

With respect to the washing machine 101 that recognizes the speech of the user, the speech recognition product, i.e., the washing machine 101, is identical to the control target device TG, i.e., the washing machine 101. In this case, the control server 240 controls the speech recognition product, i.e., the washing machine 101, based on the control command. That is, the washing machine 101 corresponds to the above-described 'B case'.

On the other hand, with respect to the dryer 102 that recognizes the speech of the user, the speech recognition product, i.e., the dryer 102, is different from the control target device TG, i.e., the washing machine 101.

Then, when the speech recognition product is different from the control target device TG, the control server 240 determines whether the speech recognition product and the control target device TG belong to the same group. At this time, both the speech recognition product, i.e., the dryer 102, and the control target device TG, i.e., the washing machine 101, belong to the first group G1.

Then, when the speech recognition product and the control target device TG belong to the same group, the control server 240 controls the speech recognition product, i.e., the dryer 102, to ignore a control command. That is, the dryer 102 corresponds to the above-described 'C case'.

Then, the control server 240 controls the speech recognition product based on the control command S560. Accordingly, the control server 240 transmits a control command to the washing machine 101 to turn on the power. On the other hand, the control server 240 transmits an ignore command (Ignore CMD) to the dryer 102 to ignore the control command.

Then, the washing machine 101 outputs a guide speech notifying that the power is turned on to the user by the speech guidance unit 120. Meanwhile, the state of the dryer 102 is converted into a standby state of the startup word without performing an additional operation.

At this time, the washing machine 101 may receive the guide speech of "the power is turned on" from the control server 240.

Then, the washing machine 101 transmits the guide speech to a TTS server 235. Then, the TTS server 235 converts the received guide speech into speech data, and transmits the converted speech data to the washing machine 101 S570.

Then, the washing machine 101 may convert the received speech data into sound through the speech guidance unit 120 and output the converted sound. That is, the washing machine 101 may output the guide speech of "the power is on" through speech.

As a result, when there are a plurality of speech recognition devices in the same space, only the device intended by the user operates based on the control command, and other home electronics may maintain the standby state. That is, the present disclosure may prevent a command conflict or mutual interference between the speech recognition devices from occurring even when there is a plurality of speech recognition products in a space where the user is disposed.

Figure 13:
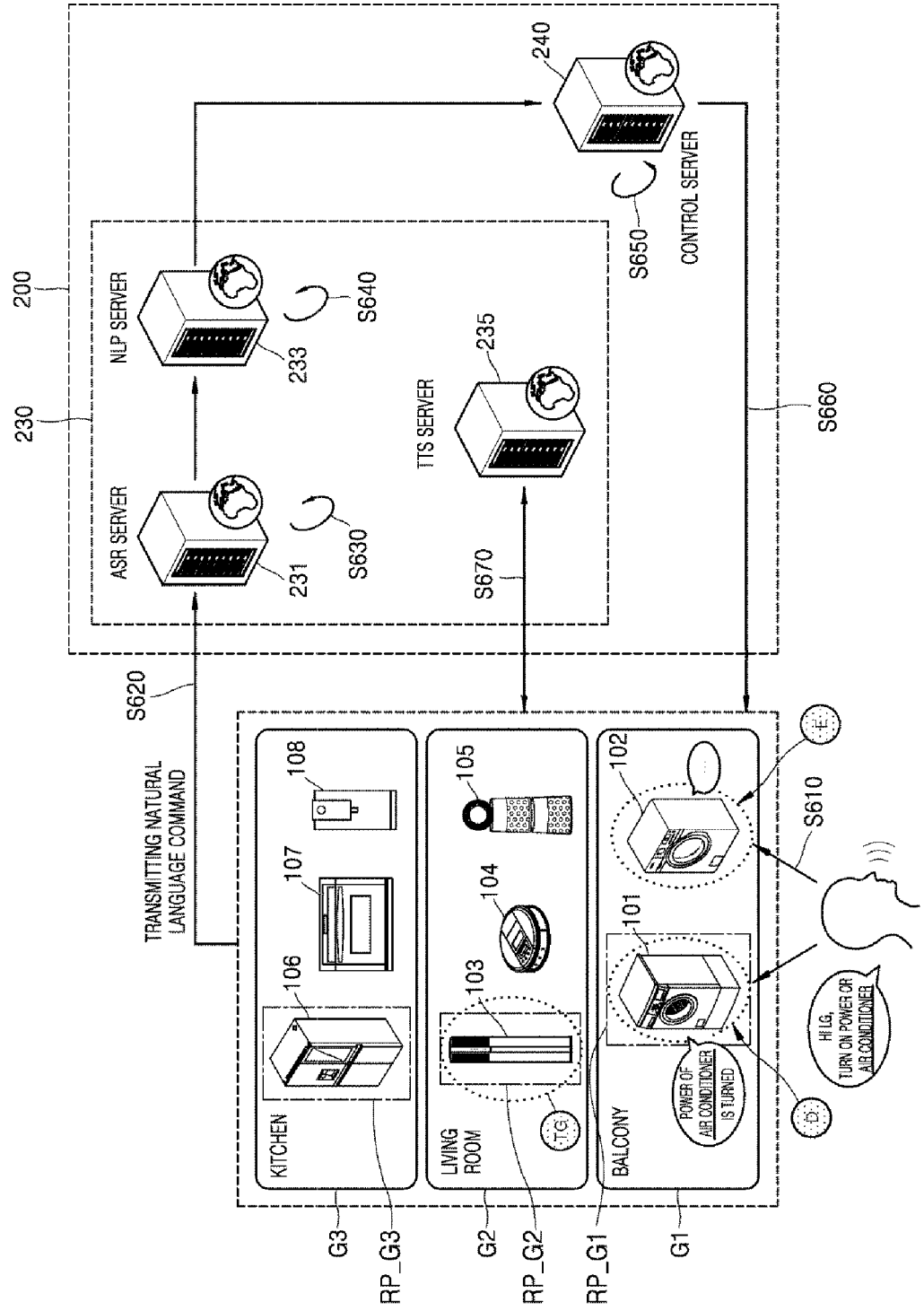
FIG. 13 is a schematic view of a method for controlling speech recognition according to a third implementation of the present disclosure.

FIG. 13 is a schematic view of a method for controlling speech recognition according to a third implementation of the present disclosure. Hereinafter, the contents overlapping with the above implementation will be omitted, and differences will be mainly described.

Referring to FIG. 13, a home appliance 100 receives speech of a user (S610). The home appliance 100 receives the speech data of the user from a speech input 110. Hereinafter, the case where the user utters "Hi LG, turn on the power of the air conditioner" in the balcony may be described as an example of a method for controlling the speech recognition of the present disclosure.

A washing machine 101 and a dryer 102 disposed in the balcony recognize a startup word from the speech data, respectively. The startup word may be "Hi LG".

Then, when the startup word is recognized, the home appliance 100 may process the contents that the user utters as a natural language command after the startup word is inputted.

Then, the speech data with respect to the natural language command may be transmitted to a speech recognition server system 200 S620. At this time, the natural language command may include speech data of "turn on the power of the washing machine".

Then, when a natural language command is received, an ASR server 231 performs a speech recognition operation on the received speech data S630. The ASR server 231 converts the received speech data into text data. The converted text data is transmitted to an NLP server 233.

Then, the NLP server 233 analyzes the result of a speech recognition operation performed by the ASR server 231 S640. That is, the NLP server 233 extracts a keyword, i.e., a control target device or a control command, for a speech command from the received text data. At this time, among the keywords extracted from the natural language command, the control target device TG may be an 'air conditioner' and the control command may be 'power on'.

Then, the NLP server 233 transmits the control target device and the control command to a control server 240.

Then, the control server 240 determines whether the control target device TG is identical to the speech recognition product S650. At this time, the control target device TG may be an air conditioner 103 and the speech recognition product may be the washing machine 101 and the dryer 102.

Then, when the control target device TG is identical to the speech recognition product, the control server 240 controls the speech recognition product based on the control command (Case B).

On the other hand, when the control target device TG is different from the speech recognition product, the control server 240 determines whether the control target device TG and the speech recognition product belong to the same group.

Then, when the control target device TG and the speech recognition device belong to the same group, the control server 240 transmits an ignore command (Ignore CMD) to the speech recognition device (Case C).

On the other hand, when the control target device TG and the speech recognition device belong to different groups from each other, the control server 240 determines whether the speech recognition device is a representative device of the group.

Then, when the speech recognition device is the representative device of the group, the control server 240 controls the control target device TG based on the control command, i.e. case D.

On the other hand, when the speech recognition device is not the representative device of the group, the control server 240 transmits the ignore command (Ignore CMD) to the speech recognition device, i.e. case E.

In the case of the washing machine 101 that recognizes the speech of the user, the speech recognition device, i.e., the washing machine 101, is different from the control target device TG, i.e., the air conditioner 103. In addition, the speech recognition device, i.e., the washing machine 101, and the control target device TG, i.e., the air conditioner 103, belong to different groups from each other. Further, the speech recognition device, i.e., the washing machine 101, corresponds to the representative device RP_G1 of the group G1. In this case, the washing machine 101 corresponds to the above-described 'D case'. Therefore, the control server 240 controls the control target device TG, i.e., the air conditioner 103, based on the control command input to the washing machine 101.

On the other hand, in the case of the dryer 102 that recognizes the speech of the user, the speech recognition device, i.e., the dryer 102, is different from the control target device TG, i.e., the air conditioner 103. Further, the speech recognition device, i.e., the dryer 102, and the control target device TG, i.e., the air conditioner 103, belong to different groups from each other. However, the speech recognition device, i.e., dryer 102, is not the representative device RP_G1 of the group G1. In this case, the dryer 102 corresponds to the above-mentioned 'E case'. Accordingly, the control server 240 controls the dryer 102 to ignore the control command input thereto.

Subsequently, the control server 240 controls the control target device TG based on the control command S660. That is, the control server 240 transmits a control command to the air conditioner 103 to turn on the power. On the other hand, the control server 240 transmits the ignore command (Ignore CMD) to the dryer 102 to ignore the control command.

Then, the control server 240 may receive the control results for the operation of the control target device TG (i.e., the air conditioner 103) to the speech recognition device, i.e., the washing machine 101.

At this time, the speech recognition product, that is, the washing machine 101, may receive the guide speech of "the power of the air conditioner is turned on" from the control server 240.

Then, the speech recognition device, i.e., the washing machine 101, transmits the guide speech to a TTS server 235. Subsequently, the TTS server 235 converts the received guide speech into speech data and transmits the converted speech data to the speech recognition product, i.e., the washing machine 101, S670.

Then, the speech recognition device, i.e., the washing machine 101, may convert the received speech data through sound by the speech guidance unit 120 and output the converted sound. That is, the washing machine 101 may output the guide speech of "the power of the air conditioner is turned on" through speech.

Thus, through the speech recognition device, the user may remotely control a control target device disposed in a space different from another space where the speech recognition device is arranged. At this time, through the speech recognition device, the control result of the control target device may be informed to the user through speech. As a result, the user may easily control the home electronics disposed in another space and confirm the control result immediately.

Figure 14:
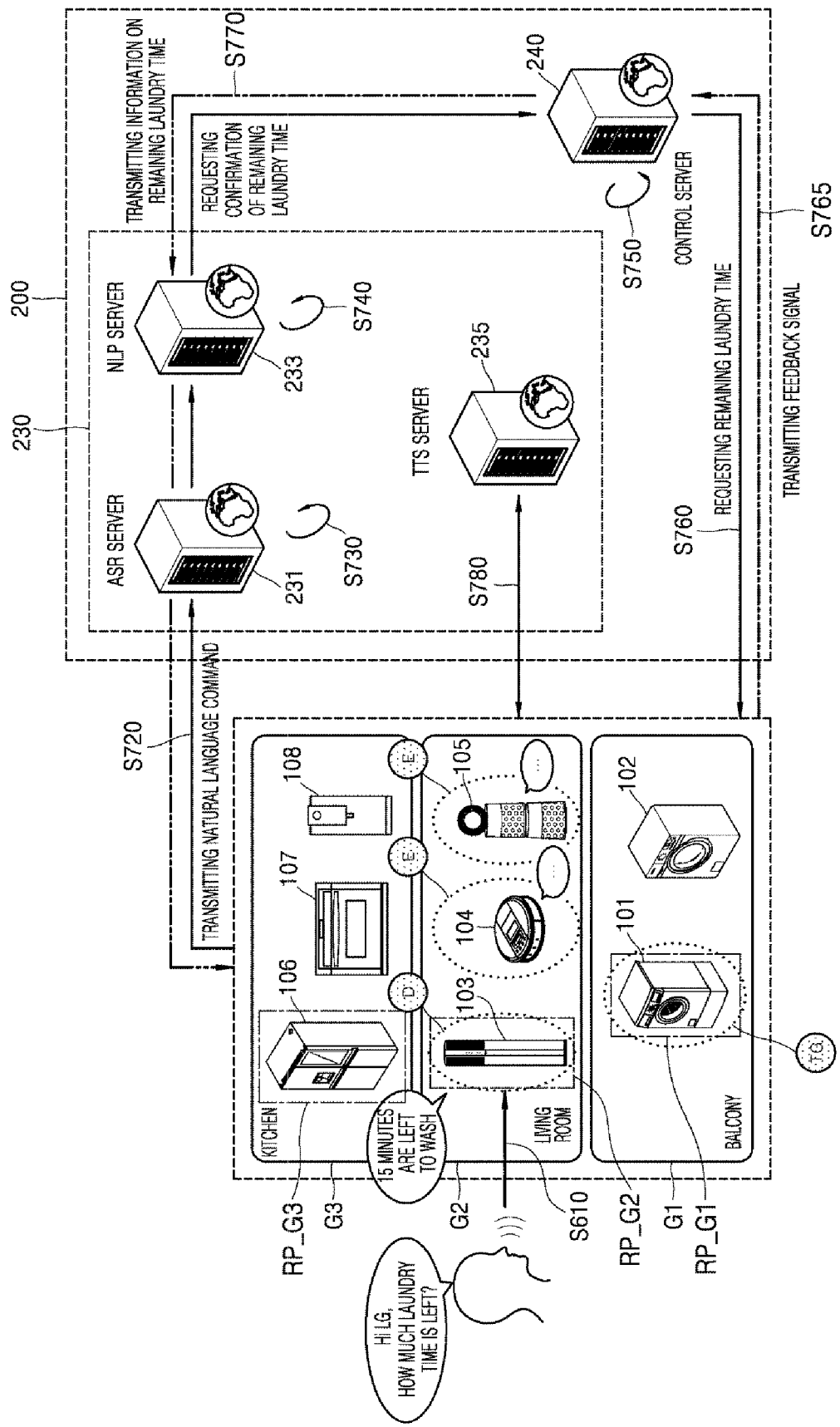
FIG. 14 is a schematic view of a method for controlling speech recognition according to a fourth implementation of the present disclosure.

FIG. 14 is a schematic view of a method for controlling speech recognition according to a fourth implementation of the present disclosure. Hereinafter, the contents overlapping with the above implementation will be omitted, and differences will be mainly described.

Referring to FIG. 14, a home appliance 100 receives speech of a user S710. The home appliance 100 receives speech data of the user from a speech input 110. Hereinafter, the case where the user utters "Hi LG, how much laundry time is left?" in the living room will be described as an example of a method for controlling the speech recognition of the present disclosure.

An air conditioner 103, the robot cleaner 104, and an air cleaner 105, which are disposed in the living room, may recognize the startup words from the speech data of the user, respectively. The startup word may be "Hi LG".

Then, when the startup word is recognized, the home appliance 100 may process the contents that the user utters as a natural language command after the startup word is inputted.

Subsequently, the speech data corresponding to the natural language command may be transmitted to the speech recognition server system 200 S620. At this time, the natural language command may include the speech data of "How much laundry time is left?".

Then, when the natural language command is received, an ASR server 231 performs the speech recognition operation on the received speech data S730. The ASR server 231 converts the received speech data into text data. The converted text data is transmitted to the NLP server 233.

Then, an NLP server 233 analyzes the result of a speech recognition operation performed by the ASR server 231 S740. That is, the NLP server 233 extracts the keyword, i.e., the control target device or the control command, for the speech command from the received text data. At this time, among the keywords extracted from the natural language command, the control command may be "how much laundry time is left?". Then, the NLP server 233 transmits a control command to a control server 240. At this time, the NLP server 233 transmits to the control server 240 that the extracted keyword has no information on the control target device.

Then, as there is no control target device in the extracted keyword, the control server 240 determines whether the received control command is a common control command or a specialized control command S450. At this time, the control server 240 may determine the kinds of control command based on a database in which the common control command and the specialized control command are stored.

In the implementation, the control command of "how much laundry time is left?" corresponds to the specialized control command for the washing machine 101. As a result, based on the control command, the NLP server 233 may select the washing machine 101 as the control target device TG Then, the NLP server 233 transmits information on the selected control target device TG and the control command to the control server 240.

Then, the control server 240 determines whether the control target device TG is identical to the speech recognition product (S650). At this time, the control target device TG may be the washing machine 101, and the speech recognition device may be the air conditioner 103, the robot cleaner 104, and the air cleaner 105.

At this time, when the control target device TG is identical to the speech recognition device, the control server 240 controls the speech recognition device based on the control command, i.e. Case B.

On the other hand, when the control target device TG is different from the speech recognition device, the control server 240 determines whether the control target device TG and the speech recognition device belong to the same group.

Then, when the control target device TG and the speech recognition device belong to the same group, the control server 240 transmits the ignore command (Ignore CMD) to the speech recognition device, i.e. Case C.

On the other hand, when the control target device TG and the speech recognition device belong to different groups from each other, the control server 240 determines whether the speech recognition device is the representative device of the group or not.

Then, when the speech recognition device is the representative product of the group, the control server 240 controls the control target device TG based on the control command, i.e. Case D.

On the other hand, when the speech recognition device is not the representative product of the group, the control server 240 transmits to ignore command (Ignore CMD) to the speech recognition device, i.e. E case.

In the case of the air conditioner 103 that recognizes the speech of the user, the speech recognition device, i.e., the air conditioner 103, is different from the control target device TG, i.e., the washing machine 101. Further, the speech recognition device, i.e., the air conditioner 103, and the control target device TG, i.e., the washing machine 101, belong to different groups from each other. The speech recognition device, i.e., the air conditioner 103, corresponds to the representative product RP_G2 of the group G2. In this case, the air conditioner 103 corresponds to the above-described 'D case'. Therefore, the control server 240 controls the control target device TG, i.e., the washing machine 101, based on the control command input to the air conditioner 103.

On the other hand, in the case of a robot cleaner 104 that recognizes the speech of the user, the speech recognition device, i.e., the robot cleaner 104, is different from the control target device TG, i.e., the washing machine 101. Further, the speech recognition product, i.e., the robot cleaner 104, and the control target device TG, i.e., the washing machine 101, belong to different groups from each other. However, the speech recognition device, i.e., the robot cleaner 104, does not correspond to the representative device RP_G2 of the group G2. In this case, the robot cleaner 104 corresponds to the above-described 'E case'. Therefore, the control server 240 controls the robot cleaner 104 to ignore the input control command.

In the case of the air cleaner 105 that recognizes the speech of the user, it corresponds to the above-described 'E case' in the same manner as the robot cleaner 104. Thus, the control server 240 controls the air purifier 105 so as to ignore the inputted control command.

Subsequently, the control server 240 controls the control target device TG based on the control command S760. That is, the control server 240 transmits a control command to the washing machine 101 to request the remaining laundry time. On the other hand, the control server 240 transmits an ignore command (Ignore CMD) to the robot cleaner 104 and the air cleaner 105 to ignore the control command.

Then, the control server 240 receives information on the control result of the operation of the control target device TG, i.e., the washing machine 101, S765. That is, the control server 240 receives information on the remaining laundry time of the washing machine 101, that is, a feedback signal.

Then, the control server 240 transmits information on the control result for the control target device TG, i.e., the washing machine 101, to the speech recognition product, i.e., the air conditioner 103, S770. That is, the control server 240 transmits remaining time information on the washing machine 101 to the air conditioner 103.

At this time, the air conditioner 103 may receive guide speech of "15 minutes are left to wash" from the control server 240.

Then, the speech recognition device, i.e., the air conditioner 103, transmits the guide speech to the TTS server 235. Subsequently, the TTS server 235 may convert the received guide speech into the speech data and transmit the converted speech data to the speech recognition device, i.e., the air conditioner 130, S780.

Then, the speech recognition product, i.e., the air conditioner 103, may convert the received speech data into speech by the speech guidance unit 120 and output the converted sound. That is, the air conditioner 103 may output the guide speech of "15 minutes are left to wash" through speech.

Thus, the user may remotely control the control target device disposed in a space different from another space where the speech recognition device is arranged. At this time, through the speech recognition device, the user may be informed of the control result of the control target device through speech. Accordingly, the user may easily control the home electronics disposed in other spaces and may immediately confirm the control results.

Figure 15:
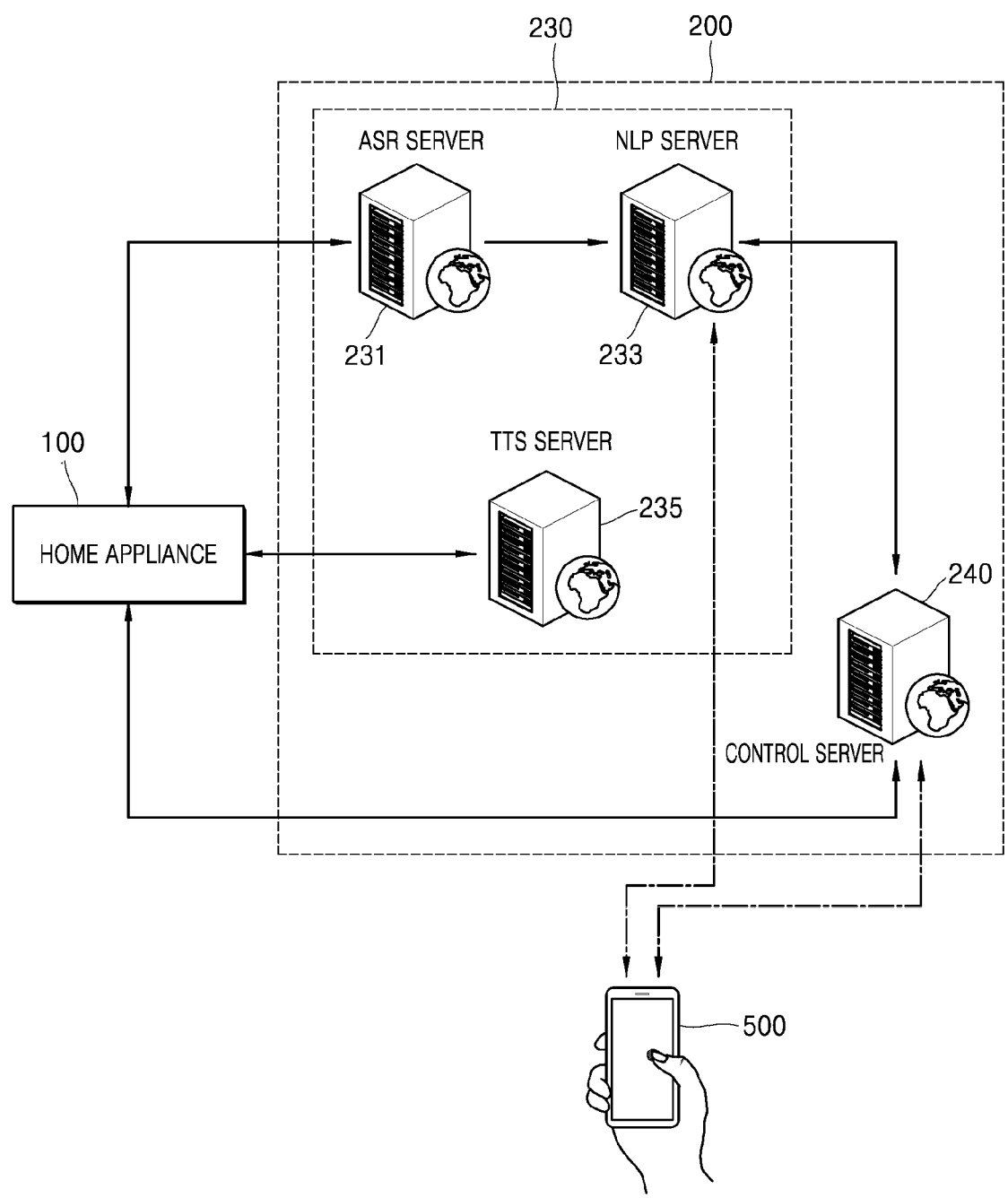
FIG. 15 shows a speech recognition server system that communicates with a user terminal.
Figure 16:
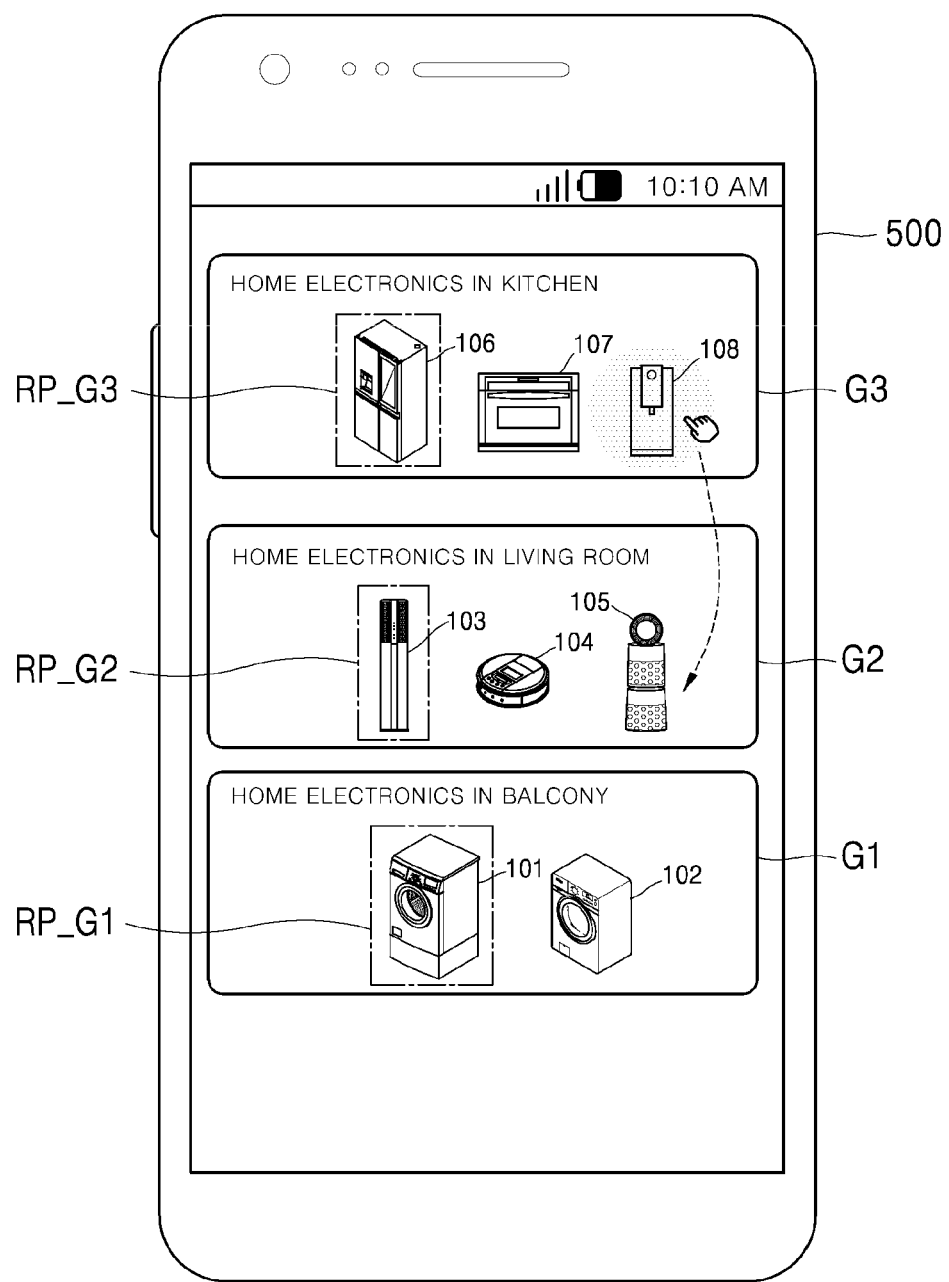
FIG. 16 shows an interface that sets a name or a nickname of the specific home electronics.
Figure 17:
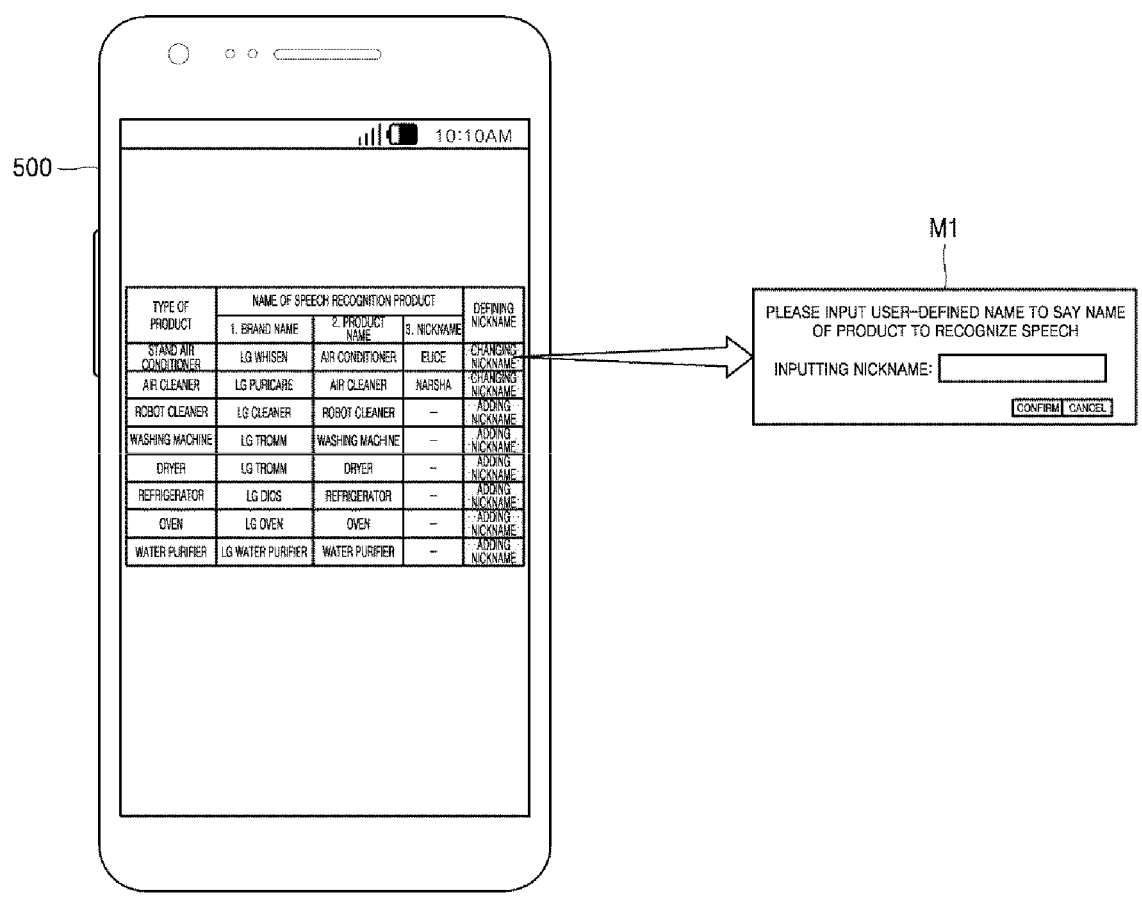
FIG. 17 shows a group change interface of a plurality of home electronics the home appliance includes.

FIG. 15 shows a speech recognition server system in communication with a user terminal. FIG. 16 shows a group change interface of a plurality of home electronics the home appliance includes. FIG. 17 shows an interface to set a name or nickname of a specific home electronics.

Referring to FIG. 15, a speech recognition server 230 and a control server 240 in a speech recognition server system 200 of the present disclosure may store group information on a plurality of home electronics included in a home appliance 100 and information on the representative devices of the group. The speech recognition server 230 or the control server 240 may control an operation of a control target device based on group information pre-stored in the database and information on the representative devices of the respective groups.

Further, the speech recognition server 230 and the control server 240 may store a name or a nickname that may identify each of home electronics included in the home appliance 100. The speech recognition server 230 or the control server 240 may determine the control target device based on the name or nickname of the home electronics pre-stored in a database.

In addition, the speech recognition server 230 may store information on a specific device to which the above-mentioned specialized control command is applied. The information on relations between the specialized control command and the specific device may be stored in a form of a database. Referring to such a database, the speech recognition server 230 may determine the control target device based on the specialized control command extracted from the natural language command.

At this time, the speech recognition server 230 and the control server 240 may change the group information on the plurality of home electronics that are included in the home appliance 100 and the representative devices of each group through a user terminal 500.

Further, the names or nicknames of home electronics may be input to the speech recognition server 230 and the control server 240 through the user terminal 500.

Referring to FIG. 16, a user terminal 500 may provide group information on a plurality of home electronics that are included in a home appliance 100, and an interface capable of changing a representative device of each group.

When the user moves the position of the home electronics, the group information has to be changed in order to perform an accurate speech recognition operation. The user terminal 500 may provide an interface through which the user may easily change the group information. Therefore, if the arrangement of home electronics is changed in the house, the user may edit group information in response to the position of the home electronics.

At this time, the user may change the group information by dragging respective home electronics on the interface. The user may also add or remove the group on the interface. When the space structure in the house due to moving or remodeling, and the like, the function for adding and removing these groups may be used.

The representative devices (RP_G1, RP_G2, RP_G3) of each group may be set automatically. However, if desired by the user, the representative devices (RP_G1, RP_G2, RP_G3) of each group may be designated and changed.

Group information changed by the user terminal 500 and the information on the representative devices of the respective groups are updated to the speech recognition server 230 and a control server 240 so as to be used.

Referring to FIG. 17, a user terminal 500 may provide an interface through which a name or a nickname that may identify the respective home electronics which are included in a home appliance 100 may be added or changed.

The user may issue a command with any one of a brand mane, the product name, or a nickname as a name of a speech recognition product. At this time, a speech recognition server 230 selects the control target device based on the name of the speech recognition devices.

At this time, the user may add the name or the nickname of each device by using the interface provided by the user terminal 500.

For example, when the user presses a 'CHANGING NICKNAME' button on the interface provided by the user terminal 500, a message window that may input a user-defined name to say the name of the device is displayed.

Then, the user may input the name or nickname of the device in the message window and store information on the inputted name or nickname of the device.

The name or nickname of each of home electronics added by the user terminal 500 may be updated by the speech recognition server 230 and used. At this time, the speech recognition server 230 may determine the control target device based on the updated name or nickname of the home electronics.

As a result, the user may control the specific device using the name or the nickname that is easy to remember. Therefore, the user convenience with respect to controlling the speech recognition device may be improved. Further, when the user utters the nickname of the device, affection of the user with respect to the product and satisfaction with the use may be improved.

While the present disclosure has been mainly described with regard to the implementations of the present disclosure hereinabove, various modifications and changes may be made at the level of those skilled in the art. Therefore, unless such a modification and change do not deviate the range of the present disclosure, it will understand that they are included in the scope of the present disclosure.

What is claimed is:

1. A method of controlling a home appliance and a speech recognition server system interacting with the home appliance, the method comprising:
   receiving, by the home appliance, a speech command that is uttered by a user;
   converting, by the speech recognition server system, the received speech command into text data;
   extracting a control target device and a control command from the converted text data;
   determining whether the control target device is identical to the home appliance;
   based on a determination that the control target device is different from the home appliance, determining whether a first group to which the control target device belongs is identical to a second group to which the home appliance belongs; and
   based on a determination that the first group is different from the second group, controlling an operation of the control target device according to the control command that was extracted from the converted text data of the speech command.

2. The method of claim 1, further comprising:
   receiving a control result for the operation of the control target device;
   transmitting information regarding the received control result to the home appliance; and
   outputting, by the home appliance, the control result through a speech output.

3. The method of claim 1, wherein controlling the operation of the control target device comprises:
   determining whether the home appliance is a representative device of the second group, and
   based on a determination that the home appliance is the representative device of the second group, controlling the operation of the control target device according to the control command that was extracted from the converted text data of the speech command.

4. The method of claim 3, wherein controlling the operation of the control target device further comprises:
   based on a determination that the home appliance is not the representative device of the second group controlling the home appliance to ignore the control command.

5. The method of claim 1, wherein the control command comprises at least one of (i) a common control command that is commonly applied to a plurality of home appliances, or (ii) a specialized control command that is applied only to specific home appliance,
   wherein extracting the control target device and the control command from the converted text data comprises:
      determining the control target device with reference to a database associated with the specialized control command when the control command comprises the specialized control command.

6. The method of claim 1, further comprising:
   receiving, from a user terminal, group information for a plurality of home appliances; and
   storing the received group information in a database,
   wherein determining whether the first group is identical to the second group comprises determining the first group and the second group based on the group information stored in the database.

7. The method of claim 1, further comprising:
receiving, from a user terminal, a name or nickname of at least one home appliance; and
storing information regarding the name or the nickname in a database,
wherein extracting the control target device and the control command from the converted text data comprises determining the control target device based on the name or the nickname stored in the database.

8. The method of claim 1, further comprising:
controlling the home appliance to ignore the control command based on the determination that the control target device is different from the home appliance and based on the determination that the first group is identical to the second group.

9. The method of claim 1, further comprising:
controlling an operation of the home appliance according to the control command when the converted text data does not comprise the control target device,
wherein controlling the operation of the home appliance comprises controlling an operation of a plurality of home appliances that received the speech command uttered by the user, according to the control command that was extracted from the converted text data of the speech command.

10. The method of claim 9, further comprising:
determining that the control command is a common control command that is commonly applied to a plurality of home appliances that received the speech command uttered by the user.

11. A home appliance, comprising:
a speech input device that is configured to receive a speech command of a user;
a natural language recognition unit that is configured to convert the received speech command into text data;
a natural language processing unit that is configured to extract a control target device and a control command from the converted text data; and
a controller that is configured to control the control target device according to the control command,
wherein the controller is configured to, based on a determination that the control target device is different from the home appliance, determine whether a first group to which the control target device belongs is identical to a second group to which the home appliance belongs, and
wherein the controller is configured to, based on a determination that the first group is different from the second group, control an operation of the control target device according to the control command that was extracted from the converted text data of the speech command.

12. The home appliance of claim 11, further comprising:
a communication device that is configured to receive a control result of the operation of the control target device;
a speech converter that is configured to convert the control result into speech data; and
a speech guidance unit that is configured to output the converted speech data through sound.

13. The home appliance of claim 12, wherein the controller is further configured to:
receive, through the communication device, group information regarding a plurality of home appliances;
store the received group information in a computer memory; and
control the operation of the control target device or the home appliance based on the group information stored in the computer memory.

14. The home appliance of claim 12,
wherein the controller is further configured to receive, through the communication device, a name or a nickname identifying at least one home appliance, and to store the name or the nickname in a computer memory,
wherein the natural language processing unit is further configured to determine the control target device based on the name or the nickname stored in the computer memory.

15. The home appliance of claim 11, wherein the controller is further configured to:
determine whether the home appliance is a representative device of the second group;
based on a determination that the home appliance is the representative device of the second group, control the operation of the control target device according to the control command; and
based on a determination that the home appliance is not the representative device of the second group, control the home appliance to ignore the control command.

16. The home appliance of claim 11, wherein the controller is further configured to:
control the home appliance to ignore the control command based on the determination that the control target device is different from the home appliance and based on the determination that the first group is identical to the second group; and
control the operation of the home appliance according to the control command based on a determination that the control target device is identical to the home appliance.

17. A speech recognition server system, comprising:
a natural language recognition server that is configured to receive, from a home appliance, a speech command of a user and to convert the speech command into text data;
a natural language processing server that is configured to extract a control target device and a control command from the converted text data; and
a control server that is configured to control the control target device according to the control command,
wherein the control server is configured to, based on a determination that the control target device is different from the home appliance, determine whether a first group to which the control target device belongs is identical to a second group to which the home appliance belongs, and
wherein the control server is configured to, based on a determination that the first group is different from the second group, control an operation of the control target device according to the control command that was extracted from the converted text data of the speech command.

18. The speech recognition server system of claim 17, wherein the control server is further configured to:
determine whether the home appliance is a representative device of the second group;
based on a determination that the home appliance is the representative device of the second group, control the operation of the control target device according to the control command; and
based on a determination that the home appliance is not the representative device of the second group, control the home appliance to ignore the control command.

19. The speech recognition server system of claim 17, wherein the control server is further configured to:
- control the home appliance to ignore the control command based on the determination that the control target device is different from the home appliance and based on the determination that the first group is identical to the second group; and
- control an operation of the home appliance according to the control command based on a determination that the control target device is identical to the home appliance.

20. The speech recognition server system of claim 17, further comprising a speech conversion server that is configured to:
- receive a control result of the operation of the control target device;
- convert the control result into speech data; and
- transmit the converted speech data to the home appliance.

* * * * *